United States Patent
Friedman et al.

(10) Patent No.: US 10,079,843 B2
(45) Date of Patent: *Sep. 18, 2018

(54) STREAMING METHOD AND SYSTEM FOR PROCESSING NETWORK METADATA

(71) Applicant: NetFlow Logic Corporation, Atherton, CA (US)

(72) Inventors: William G. Friedman, Atherton, CA (US); Alexander Velednitsky, Menlo Park, CA (US)

(73) Assignee: NETFLOW LOGIC CORPORATION, Atherton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/206,267

(22) Filed: Jul. 9, 2016

(65) Prior Publication Data

US 2017/0013001 A1    Jan. 12, 2017

Related U.S. Application Data

(62) Division of application No. 13/669,235, filed on Nov. 5, 2012, now Pat. No. 9,392,010.

(Continued)

(51) Int. Cl.
*G06F 15/16* (2006.01)
*H04L 29/06* (2006.01)
(Continued)

(52) U.S. Cl.
CPC ......... *H04L 63/1416* (2013.01); *H04L 43/16* (2013.01); *H04L 47/20* (2013.01);
(Continued)

(58) Field of Classification Search
None
See application file for complete search history.

(56) References Cited

U.S. PATENT DOCUMENTS 7,633,944 B1   12/2009  Chang et al.
7,653,633 B2   1/2010   Villella et al.
(Continued)

OTHER PUBLICATIONS

USPTO, ISA/US, International Search Report and Written Opinion in PCT Application No. PCT/US2014/010932, dated Jun. 3, 2014, 9 pages.

(Continued)

*Primary Examiner* — Christopher Revak
(74) *Attorney, Agent, or Firm* — Kang S. Lim

(57) ABSTRACT

A method and system for processing network metadata is described. Network metadata may be processed by dynamically instantiated executable software modules which make policy-based decisions about the character of the network metadata and about presentation of the network metadata to consumers of the information carried by the network metadata. The network metadata may be type classified and each subclass within a type may be mapped to a definition by a unique fingerprint value. The fingerprint value may be used for matching the network metadata subclasses against relevant policies and transformation rules. For template-based network metadata such as NetFlow v9, an embodiment of the invention can constantly monitor network traffic for unknown templates, capture template definitions, and informs administrators about templates for which custom policies and conversion rules do not exist. Conversion modules can efficiently convert selected types and/or subclasses of network metadata into alternative metadata formats.

20 Claims, 23 Drawing Sheets

| At least one policy exists for NetFlow Data FlowSet record type R | At least one conversion rule exists for NetFlow Data FlowSet record type R | Default conversion rule is enabled | NetFlow record R treatment |
|---|---|---|---|
| Yes | Yes | N/A | NetFlow record R is processed according to the existing policies and, if the record is not discarded by one of the policies, according to the existing conversion rules. The default conversion rule does not affect the output. |
| No | Yes | N/A | NetFlow record R is processed according to the existing conversion rule. The default conversion rule does not affect the output. |
| Yes | No | Yes | NetFlow record R is processed according to the existing policies and, if the record is not discarded by one of the policies, is converted to a syslog packet using the default conversion rule. |
| Yes | No | No | NetFlow record R is processed according to the existing policies and, if the record is not discarded by one of the policies, is forwarded in a separate NetFlow packet to a NetFlow consumer if such is configured in the NF2SL system. |
| No | No | No | NetFlow messages are forwarded without changes to a NetFlow consumer if such is configured in the NF2SL system. |

Related U.S. Application Data

(60) Provisional application No. 61/556,817, filed on Nov. 7, 2011, provisional application No. 61/699,823, filed on Sep. 11, 2012.

(51) Int. Cl.
  *H04L 12/26* (2006.01)
  *H04L 12/813* (2013.01)
  *H04L 29/12* (2006.01)

(52) U.S. Cl.
  CPC ........ *H04L 63/102* (2013.01); *H04L 63/1425* (2013.01); *H04L 63/20* (2013.01); *H04L 61/1511* (2013.01)

(56) References Cited

U.S. PATENT DOCUMENTS

| | | | | |
|---|---|---|---|---|
| 7,996,427 B1* | 8/2011 | Flick | ................. | G06F 17/30997 |
| | | | | 707/792 |
| 8,011,010 B2* | 8/2011 | Michael | ................. | G06F 21/562 |
| | | | | 726/22 |
| 8,359,320 B2* | 1/2013 | Howcroft | .......... | G06F 17/30038 |
| | | | | 707/756 |
| 8,483,056 B2* | 7/2013 | Chen | ................... | H04L 43/0876 |
| | | | | 370/230 |
| 8,631,022 B2* | 1/2014 | Howcroft | .......... | G06F 17/30038 |
| | | | | 707/756 |
| 8,688,703 B1* | 4/2014 | Antova | ............. | G06F 17/30289 |
| | | | | 707/713 |
| 9,392,010 B2* | 7/2016 | Friedman | .............. | H04L 63/102 |
| 2002/0001395 A1* | 1/2002 | Davis | ...................... | G06F 21/10 |
| | | | | 382/100 |
| 2002/0083175 A1 | 6/2002 | Afek et al. | | |
| 2007/0033190 A1* | 2/2007 | Dodaro | .................... | G06F 21/10 |
| 2007/0115850 A1 | 5/2007 | Tsuchiya et al. | | |
| 2007/0234426 A1 | 10/2007 | Khanolkar et al. | | |
| 2008/0177755 A1* | 7/2008 | Stern | ....................... | G06F 21/568 |
| 2009/0016236 A1 | 1/2009 | Alcala et al. | | |
| 2009/0019458 A1* | 1/2009 | Katari | ....................... | G06F 9/541 |
| | | | | 719/328 |
| 2010/0011031 A1 | 1/2010 | Huang et al. | | |
| 2010/0071065 A1 | 3/2010 | Khan et al. | | |
| 2010/0287141 A1* | 11/2010 | Prahlad | ................. | G06F 3/0607 |
| | | | | 707/645 |
| 2011/0004876 A1 | 1/2011 | Wu et al. | | |
| 2011/0113109 A1* | 5/2011 | LeVasseur | .............. | H04L 51/12 |
| | | | | 709/206 |
| 2012/0079527 A1* | 3/2012 | Trimper | .............. | H04N 21/2225 |
| | | | | 725/31 |
| 2014/0074894 A1* | 3/2014 | Han | .................. | H04N 21/23109 |
| | | | | 707/803 |
| 2014/0075557 A1* | 3/2014 | Balabine | ................. | H04L 63/20 |
| | | | | 726/23 |

OTHER PUBLICATIONS

Open Network Foundation, "Software-Defined Networking: The New Norm for Networks", (online) published Apr. 13, 2012 (retrieved on May 20, 2014) URL:https://www.opennetworking.org/images/stories/download/sdn-resources/white-papers/wp-sdn-newborn.pdf, 12 pages.

Korean Intellectual Property Office, ISA/KR, "International Search Report and Written Opinion" in PCT Application No. PCT/US2012/063749, dated Feb 25, 2013, 12 pages.

* cited by examiner

| At least one policy exists for NetFlow Data FlowSet record type R | At least one conversion rule exists for NetFlow Data FlowSet record type R | Default conversion rule is enabled | NetFlow record R treatment |
|---|---|---|---|
| Yes | Yes | N/A | NetFlow record R is processed according to the existing policies and, if the record is not discarded by one of the policies, according to the existing conversion rules. The default conversion rule does not affect the output. |
| No | Yes | N/A | NetFlow record R is processed according to the existing conversion rule. The default conversion rule does not affect the output. |
| Yes | No | Yes | NetFlow record R is processed according to the existing policies and, if the record is not discarded by one of the policies, is converted to a syslog packet using the default conversion rule. |
| Yes | No | No | NetFlow record R is processed according to the existing policies and, if the record is not discarded by one of the policies, is forwarded in a separate NetFlow packet to a NetFlow consumer if such is configured in the NF2SL system. |
| No | No | No | NetFlow messages are forwarded without changes to a NetFlow consumer if such is configured in the NF2SL system. |

Fig.6

STREAMING METHOD AND SYSTEM FOR PROCESSING NETWORK METADATA

CROSS REFERENCE TO RELATED APPLICATIONS

This is a Divisional application which claims the benefit of U.S. application Ser. No. 13/669,235 filed on Nov. 5, 2012, currently allowed, which claims the benefit of U.S. provisional application No. 61/556,817 filed on Nov. 7, 2011, and also claims the benefit of U.S. provisional application No. 61/699,823, filed Sep. 11, 2012, all applications are incorporated herein in their entirety by this reference.

FIELD OF THE INVENTION

In general the present invention relates to network monitoring and event management. More specifically it relates to processing of network metadata obtained through network monitoring activities and a subsequent processing of the metadata, which may efficiently result in useful information being reported in a timely manner to a consumer of the metadata.

BACKGROUND

Network monitoring is a critical information technology (IT) function often used by Enterprises and Service Providers, which involves watching the activities occurring on an internal network for problems related to performance, misbehaving hosts, suspicious user activity, etc. Network monitoring is made possible due to the information provided by various network devices. The information has been generally referred to as network metadata, i.e., a class of information describing activity on the network which is supplemental and complimentary to the rest of information transmitted over the network.

Syslog is one type of network metadata commonly used for network monitoring. Syslog is a standard for logging program messages and provides devices which would otherwise be unable to communicate a means to notify administrators of problems or performance. Syslog is often used for computer system management and security auditing as well as generalized informational, analysis, and debugging messages. It is supported by a wide variety of devices (like printers and routers) and receivers across multiple platforms. Because of this, syslog can be used to integrate log data from many different types of systems into a central repository.

More recently, another type of network metadata, referred to by various vendors as NetFlow, jFlow, sFlow, etc., has also been introduced as a part of standard network traffic (hereafter generally referred to as "NetFlow".) NetFlow is a network protocol for collecting IP traffic information that has become an industry standard for traffic monitoring. NetFlow can be generated by a variety of network devices such as routers, switches, firewalls, intrusion detection systems (IDS), intrusion protection systems (IPS), network address translation (NAT) entities and many others. However, until recently, NetFlow network metadata was used exclusively for post factum network supervision purposes such as network topology discovery, locating network throughput bottlenecks, Service Level Agreement (SLA) validation, etc. Such limited use of NetFlow metadata can generally be attributed to the high volume and high delivery rate of information produced by the network devices, the diversity of the information sources and an overall complexity of integrating additional information streams into existing event analyzers. More particularly, NetFlow metadata producers have typically generated more information than consumers could analyze and use in a real time setting. For example, a single medium to large switch on a network might generate 400,000 NetFlow records per second.

Today's syslog collectors, syslog analyzers, security information management (SIM) systems, security event management (SEM) systems, security information and event management (SIEM) systems, etc. (collectively hereafter referred to as an "STEM system") are either incapable of receiving and analyzing NetFlow, are limited to processing rudimentary information contained in NetFlow packets, or process NetFlow packets at rates much lower than such packets are typically generated.

The advent of robust network monitoring protocols such as NetFlow v9 (RFC 3954) and IPFIX (RFC 5101 and related IETF RFC) drastically expands the opportunity to use network metadata in the realm of network security and intelligent network management. At the same time, due to the constraints identified above, today's SIEM systems are not generally capable of utilizing network monitoring information beyond simply reporting observed byte and packet counts.

SUMMARY OF THE INVENTION

Network managers and network security professionals continuously confront and struggle with a problem often referred to in the industry as "Big Data". Some of the issues created by the Big Data problem include an inability to analyze and store massive amounts of machine-generated data that often exists in different formats and structures. The problems commonly experienced can be summarized as follows:

1. Too much data to analyze in real time to acquire timely insight into network conditions.

2. Data arrives in different formats from different device types on a network, making correlation of data from different device types difficult and slow; and 3. Too much data to store (e.g., for later analysis and/or for compliance with data retention requirements).

The present invention provides a system and method capable of addressing all of the above-identified problems associated with Big Data by providing the ability to analyze large volumes of metadata in real time, convert large volumes of metadata into a common format that allows ready correlation with other data within a single monitoring system, and dramatic reduction in the volume of the incoming data through real time data reduction techniques such as packet validation, filtering, aggregation and de-duplication.

Embodiments of the present invention are able to check the validity of incoming packets of network metadata and discard malformed or improper messages. Embodiments are also able to examine and filter incoming packets of network metadata in real time to identify relevant aspects of their information content and segment or route different streams of incoming network metadata for differing processing within the processing engine of the present invention. Included in such differing processing is the opportunity to reduce output metadata traffic by dropping particular messages or selected streams of messages based upon criteria that can be configured by a network manager and determined during the early examination of incoming messages. This enables a network manager to focus the network analysis, either on an ongoing basis or temporarily in response to a particular network condition. As an example, a network manager can elect to focus attention upon network metadata within the system that is generated only be the edge devices on the network to investigate possible intrusion events.

Embodiments of the present invention are further able to aggregate the information content contained in incoming packets of network metadata and replace a large quantity of related packets with one or a much smaller number of other packets that capture the same information but generate a much smaller downstream display, analysis and storage requirement than the original metadata flow.

Embodiments of the present invention are further able to de-duplicate the content of the normal metadata flow generated by the network devices. Because incoming traffic is typically routed within the network through a sequence of network devices to its destination device, and because each network device typically generates network metadata for each flow that traverses it, a significant amount of redundant metadata is generated that contributes to the Big Data problem in the industry.

The present invention relates to a system and method capable of receiving arbitrary structured data, e.g., network or machine-generated metadata, in a variety of data formats (hereafter network metadata), efficiently processing the network metadata and forwarding the received network metadata and/or network metadata derived from the original network metadata in a variety of data formats. Network metadata could be generated by a variety of network devices such as routers, switches, firewalls, intrusion detection systems (IDS), intrusion protection systems (IPS), network address translation (NAT) entities and many others. The network metadata information is generated in a number of formats including but not limited to NetFlow and its variants, (e.g., jFlow, cflowd, sFlow, IPFIX), SNMP, SMTP, syslog, etc. The method and system described herein is able to output network metadata information in a number of formats including but not limited to NetFlow and its versions, (jFlow, cflowd, sFlow, IPFIX,) SNMP, SMTP, syslog, OpenFlow, etc. In addition, embodiments of the invention are able to output selected types of network metadata information at a rate sufficient to allow real-time or near-real-time network services to be provided. As a result, the system is capable of providing meaningful services in deployments with N (N≥1) producers of the network metadata and M (M≥1) consumers of the original or derived network metadata. It may be appreciated that a particular embodiment of this invention aligns with a definition of IPFIX Mediator as reflected in RFC 5982.

An embodiment of the present invention provides a method and system for identifying the nature, character and/or type ("class") of received network metadata and organizing received information into categories or classes. This may be of particular usefulness when used in association with NetFlow v9 and similar messages that are template-based and can be of widely varied content and purpose. Once categorized or classified, each individual class member instance can be further processed according to zero, one or a plurality of class specific processing rules or according to a default processing rule ("policies"). This aspect of the invention enables fine grain processing of an unlimited variety of network metadata types.

By identifying the class of incoming network metadata at an early stage of the operation, the embodiment is able to efficiently organize the processing of network metadata, and in appropriate circumstances, reduce the amount of processing required by filtering, consolidating and/or eliminating portions of the network metadata that is of limited interest to the system administrator, thereby contributing to the real-time or near-real-time operation of the system and potentially reducing storage requirements at a network metadata collector. For example, as a particular body of network traffic traverses multiple devices in a network, network metadata may be generated from each traversed device that contains redundant information. Depending upon the focus or areas of monitoring defined within the SIEM system, it may be desirable to filter, aggregate, consolidate or eliminate metadata records containing redundant information from the metadata flow forwarded to the SIEM system. Policies can be introduced that remove redundancies from certain classes of network metadata that are directed to the STEM system, while at the same time preserving all such metadata for the flow that is directed to a collector.

It will thus be appreciated that the policies implemented by embodiments of the invention can be defined in a manner that supports and/or are coordinated with policies or areas of focus of a STEM system and/or metadata collector that is operating within the network.

Policies can be introduced for the purpose of detecting important or unusual network events that might be indicative of security attacks, reporting traffic spikes on the network, detecting attacks on the network, fostering better usage of network resources, and/or identifying applications running on the network, for network management and security purposes. Policies can be general purpose or time-based, and can be applied to a specific class or a subset of the network metadata passing through the network. An embodiment of the invention contemplates the provision of multiple working threads that operate in cooperation with multiple policy modules to increase system throughput and performance.

Working threads can be introduced that are specialized or tuned for use with a particular class or subclass of network metadata to further enhance system performance and throughput. Such specialized working threads and policy modules can perform processing operations on different portions of the stream of network metadata in parallel to enhance system performance and throughput. Further, in response to a heavy volume of a particular class or subclass of network metadata, multiple instances of the specialized working thread and/or policy module can be instantiated to operate in parallel to further enhance system performance and throughput.

For example, an embodiment of this invention provides a unique capability of detecting externally controlled network hosts ("botnet member") residing on an internal network. Consider an infected network host operated by a central controller ("botnet master"). Typically, detection of malicious content on a network host requires installing a dedicated plug-in module on that host. This method does not work against sophisticated malicious agents ("rootkit") which are undetectable by any host-based means. An embodiment of the present invention introduces a policy which is able to identify and notify a security system about an act of communication between a botnet master and a botnet member on the internal network.

Due to the use of the network metadata information, intelligence provided by the present invention achieves a higher degree of trustworthiness than intelligence provided by similar-in-purpose devices exposed to the network traffic. For example, an in-line Intrusion Detection System (IDS) or Intrusion Detection System (IPS) exposed to malicious traffic could be compromised or subject to a Denial of Service ("DoS") attack while the present invention can be deployed on an internal network inaccessible to such attackers.

Furthermore, the present invention enables transforming network metadata which makes it suitable for deployments which require network metadata obfuscation.

According to another embodiment of the present invention, the method and system may be implemented in a streaming fashion, i.e., processing the input network metadata as it arrives ("in real-time or near-real-time") without the need to resort to persistent storage of the network metadata. This embodiment of the invention allows deployment of the system and method on a computer with limited memory and storage capacity, which makes the embodiment especially well suited for deployments in a computing cloud.

After processing a class member instance according to a policy or a plurality of policies, an embodiment of the present invention may provide an efficient method for converting the results of the policies' application into zero, one or more representations ("converter") suitable for further processing by recipients of the converted network metadata or the original network metadata. As a result, the system and method disclosed herein is exceptionally well suited for deployments in existing environments where its output may be directed towards existing diverse components such as SIEM systems adapted for use with syslog metadata.

An embodiment of the invention provides a plurality of converters that may be customized for a particular class or classes of network metadata and/or output format, thereby increasing throughput of the system to better enable real-time or near-real-time services on the network. Further, in response to a heavy volume of a particular class or subclass of network metadata, multiple instances of the customized working thread and/or conversion modules can be instantiated to operate in parallel to further enhance system performance and throughput.

Furthermore, an embodiment of the present invention is able to ensure integrity of the converted network metadata by appending message authentication codes. This embodiment of the invention enables sophisticated network metadata recipients to verify authenticity of the received information.

Yet another embodiment of this invention is the ability to deploy the system and method in a fashion transparent to the existing network ecosystem. This embodiment does not require any change in the existing network components' configuration.

Another embodiment of the present invention provides a method and apparatus for describing network metadata processing and conversion rules either in visual or in textual terms or a combination thereof. Once the policies' description is complete and verified to be non-contradicting, the policies and converters applicable to a class member subject to the rules may be instantiated as one or a plurality of executable modules simultaneously derived from one or a plurality of the network metadata processing and conversion rules definitions. As a result, systemic policy consistency is achieved across a plurality of modules. Furthermore, the binary nature of the modules implementing the policies and conversion rules makes the system capable of handling the input network metadata at rates significantly exceeding processing rates in environments which interpret comparable processing rules.

BRIEF DESCRIPTION OF THE DRAWINGS

In order that the present invention may be more clearly ascertained, some embodiments will now be described, by way of example, with reference to the accompanying drawings, in which:

FIG. 6 is a table that illustrates one logic flow that may be used to analyze metadata in accordance with an embodiment of the present invention;

DETAILED DESCRIPTION OF THE INVENTION

Figure 1:
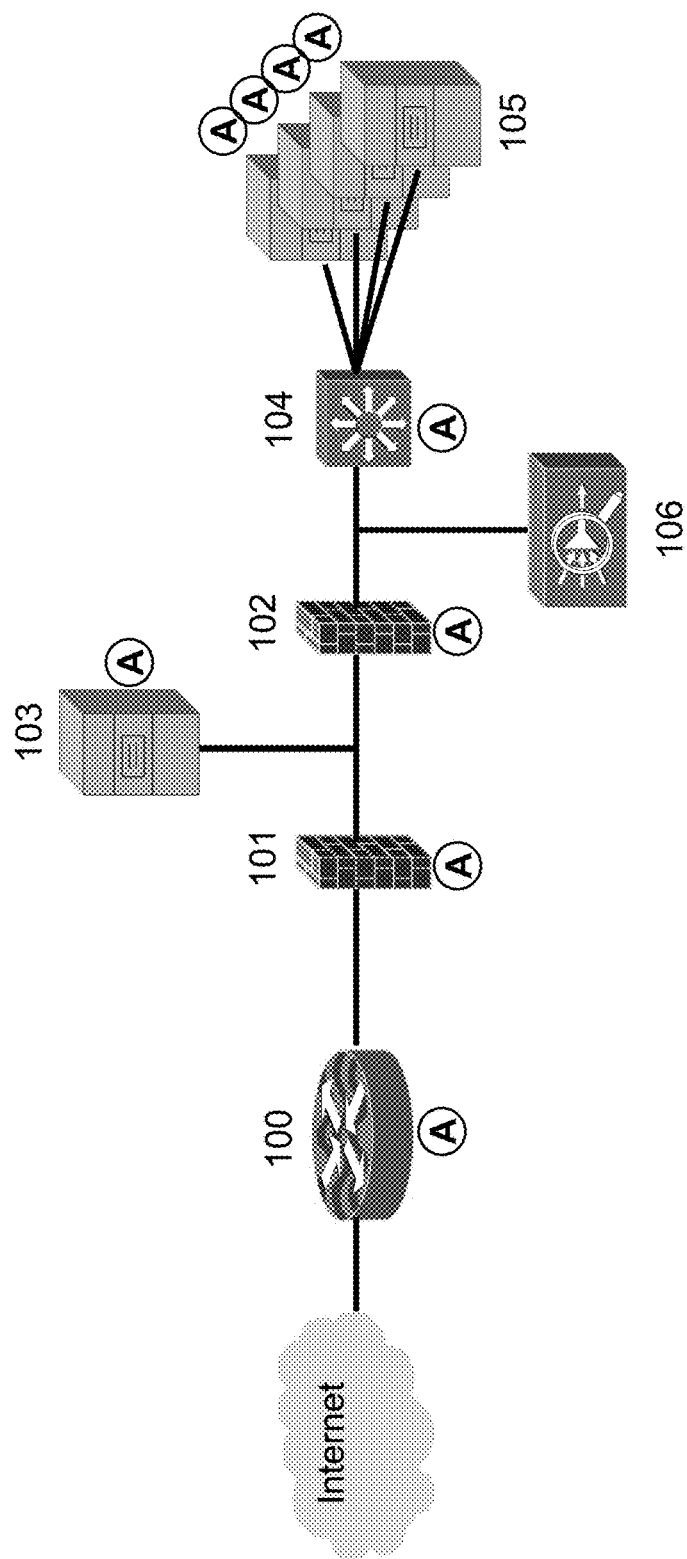
FIG. 1 provides a simplified schematic diagram of a network system including a variety of network devices that generate metadata that can be analyzed in accordance with an embodiment of the present invention.

In general the present invention relates to network monitoring and event management. More specifically it relates to processing network metadata obtained as a result of network monitoring activities and subsequent processing of the metadata, which may result in useful information being reported to an event management entity in a timely manner.

In the following description, the invention is disclosed in the context of network metadata processing for the purposes of illustration only. However, it will be appreciated that the invention is suitable for a broader variety of applications and uses and certain embodiments of the invention are applicable in contexts other than network metadata processing. For example, in an OpenFlow compliant environment, the system may receive NetFlow information from the network and output instructions to an OpenFlow Controller.

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "will," "will not," "shall," "shall not," "must," "must not," "only," "first," "initially," "next," "subsequently," "before," "after," "lastly," and "finally," are not meant to limit the scope of the present invention as the embodiments disclosed herein are merely exemplary.

In one embodiment of this invention, the method and system may be implemented using a NetFlow to Syslog Converter ("NF2SL")—a software program which enables integrating NetFlow versions 1 through 8, NetFlow v9, jFlow, sflowd, sFlow, NetStream, IPFIX and similar ("NetFlow") producers with any STEM system capable of processing syslog. The integration is achieved by converting network metadata generated by the NetFlow producers on the network into a lingua franca of network monitoring systems—syslog. Mapping of the NetFlow information to corresponding syslog information may be performed according to policies, rules and priorities established by the NF2SL Administrator.

Today's syslog collectors, syslog analyzers, SIM, SEM and STEM systems, etc., (collectively hereafter referred to as an "SIEM system") are incapable of receiving and analyzing NetFlow, or are limited to processing rudimentary information contained in NetFlow packets, or do so at low rates that limit the timeliness and usefulness of the results. The embodiment of the invention that is implemented via a NF2SL system can serve as an intelligent intermediary between the NetFlow producers on the network and the STEM systems, enabling the latter to assess information at a granularity, depth and speed not possible otherwise.

When deployed on a network, an embodiment of the NF2SL system can generally include the functions of receiving NetFlow packets, identifying and classifying the NetFlow records in the packets, matching NetFlow records found in the received packets against policies provided by the NF2SL Administrator, processing the NetFlow records according to the applicable policies, mapping information in the NetFlow records to syslog packets as dictated by an NF2SL Administrator, converting the received, consolidated and/or newly generated NetFlow records from NetFlow format into syslog format, and forwarding the resulting syslog packets to one or a plurality of designated STEM systems. Such an NF2SL system can significantly increase the number of information sources and the volume and timeliness of useful information made available to a STEM system for data analysis and correlation.

FIG. 1 depicts an exemplary network comprised of a head-end router 100, external firewall 101, internal firewall 102, a publicly available web server 103 deployed between firewalls 101 and 102 in the "DMZ" network, a data center switch 104 and application servers 105. In a typical deployment, the above entities are configured to forward generated syslog messages to a STEM system 106. An exemplary collection of entities reporting syslog messages to the STEM system 106 are identified as "Group A".

Figure 2:
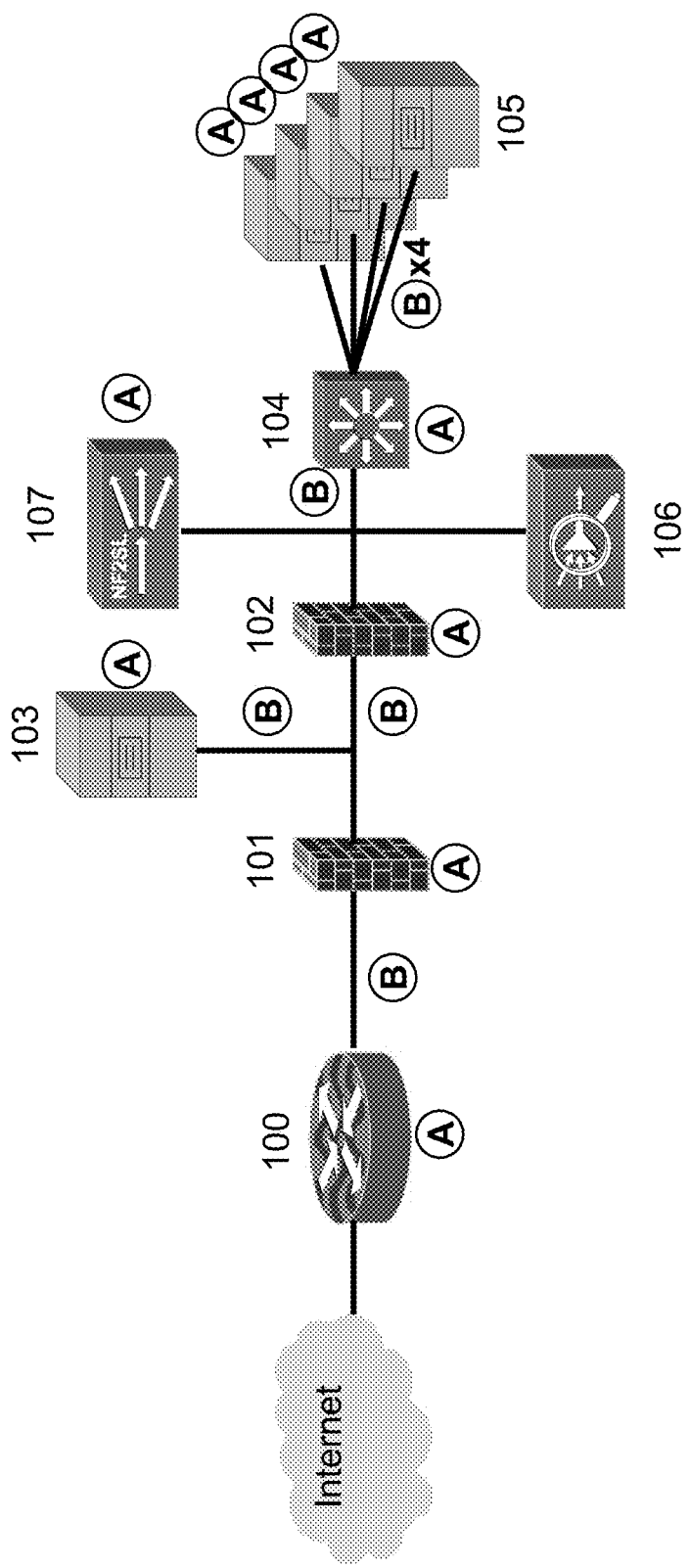
FIG. 2 provides a simplified schematic diagram of a network system including a variety of network devices that generate metadata and a system in accordance with an embodiment of the present invention for analyzing such metadata.

Referring to FIG. 2, when an embodiment of the invention implemented using an NF2SL system 107 is introduced into the network, one or more of head end router 100, external firewall 101, internal firewall 102 and the data center switch 104 may be configured for exporting NetFlow messages to the NF2SL system 107. In this exemplary network topology, the NF2SL system 107 receives network metadata in NetFlow packets, identifies and/or classifies the NetFlow records, processes network metadata found in these packets (including filtering for and aggregating of NetFlow messages of particular interest) according to the policies configured by the NF2SL Administrator, optionally generates additional NetFlow messages as a result of such processing, efficiently converts selected ones of the NetFlow messages to syslog messages, and forwards the resulting syslog messages to the SIEM system 106. Thus, the network interfaces of the network head end router 100, external firewall 101, internal firewall 102, web server 103, application servers 105 and the data center switch 104 on which NetFlow producers to the NF2SL system 107 are configured comprise an additional group of the entities reporting potentially useful information, in "real time" or near-real time, to the SIEM system 106, mediated by the NF2SL system 107. A collection of entities reporting to the STEM system 106 via the NF2SL system are identified as "Group B".

Comparing the number of information sources on FIG. 1 and FIG. 2, one could easily realize that introduction of the NF2SL system 107 of FIG. 2 almost effectively doubles the number of potential information sources which produce data suitable for correlation and analysis to the STEM system 106. This aspect of the invention significantly increases visibility into conditions and activities on the network.

Yet another aspect of this embodiment of the invention is the NF2SL system implementation versatility. Due to its platform independent nature, the NF2SL system may be implemented, without limitation, on a dedicated network appliance, on a stand-alone server, on a cloud based virtual machine or on any other networked computing device. As a result, users may choose an NF2SL implementation which best satisfies their needs and budget. It also may be implemented to receive NetFlow information from selected network devices rather than from all NetFlow producing devices on the network.

Figure 3:
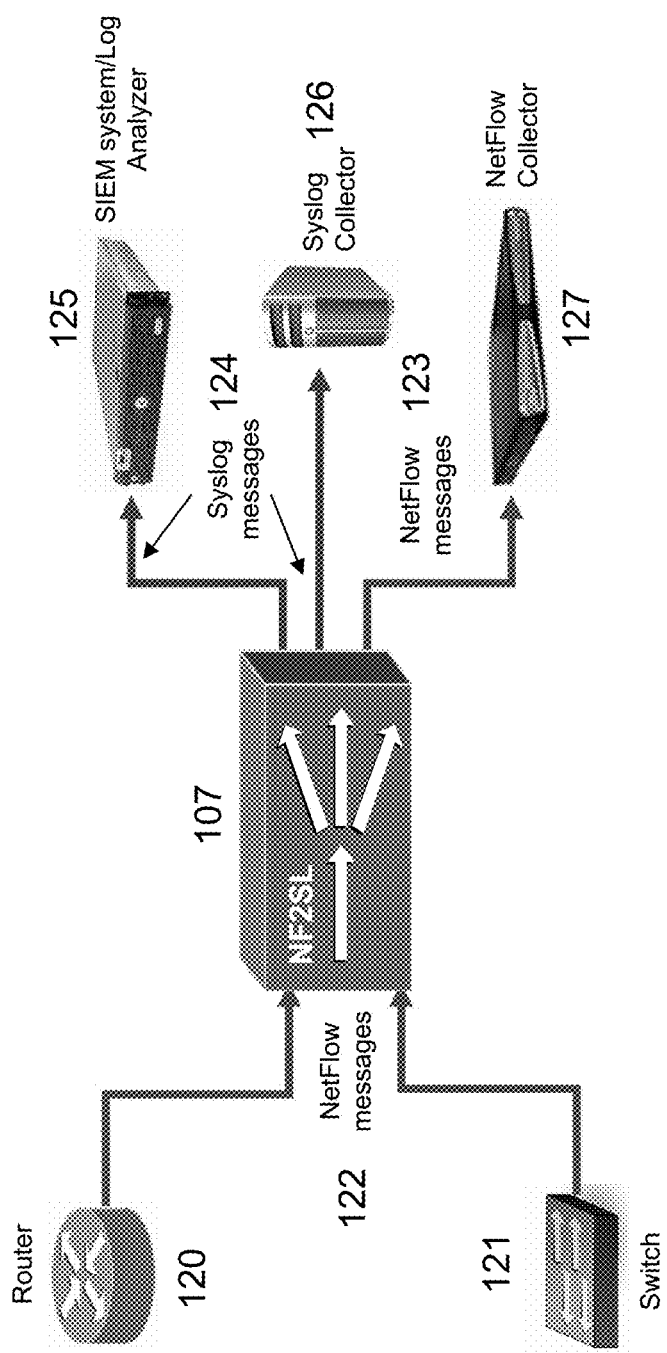
FIG. 3 provides a simplified schematic diagram of a network system including a variety of network devices that generate metadata that can be analyzed in accordance with an embodiment of the present invention, and network devices to which analyzed metadata can be provided system in accordance with an embodiment of the present invention.

FIG. 3 demonstrates an exemplary NF2SL system deployment in conjunction with NetFlow producers and syslog and NetFlow consumers. In this embodiment, NF2SL system 107 receives NetFlow messages 122 from an exemplary collection of NetFlow producers represented by a Router 120 and a Switch 121. Upon processing received NetFlow messages according to the policies supplied by the NF2SL Administrator, NF2SL system 107 forwards the resulting syslog messages 124 to a collection of syslog information consumers exemplified on FIG. 3 by a STEM system/syslog analyzer 125 and a syslog collector 126. If desired, the NF2SL system 107 may also be configured to forward the original NetFlow messages, a subset of the original NetFlow messages, or a superset of the original NetFlow messages 123 to a NetFlow Collector device 127. Regulatory compliance often requires that all syslog and NetFlow message traffic be retained by the network administrator in syslog collector 126 and NetFlow Collector 127 respectively.

Referring to FIG. 3, in the situation in which a NetFlow Collector device 127 has already been deployed on the network and Router 120 and Switch 121 were exporting NetFlow information to NetFlow Collector device 127, the NF2SL system 107 may, by way of example, be configured in respect to the NetFlow producers Router 120 and Switch 121 and the NetFlow Collector device 127 in several different exemplary ways, such as:

Router 120 and Switch 121 configuration may be amended to forward NetFlow messages 122 to the NF2SL system 107 and the NF2SL system 107 may be configured to forward the resulting NetFlow messages 123 to NetFlow Collector device 127.

The NetFlow Collector device 127 IP address may be amended and assigned to the NF2SL system 107. The latter then receives NetFlow messages 122 and may forward those to an IP address newly assigned to NetFlow Collector device 127.

The NF2SL system 107 may be deployed in a "promiscuous" mode in which all traffic passing on the local network is visible to the NF2SL system 107, thus making the NF2SL system totally transparent to the NetFlow Collector device 127. This NF2SL system 107 deployment mode requires the least effort since configuration of the NetFlow Collector device 127 and Router 120 and Switch 121 does not change. A downside of using this NF2SL system 107 deployment mode is greater difficulty in providing policies which influence the stream of NetFlow messages 122. It will be appreciated that in this deployment mode, the NF2SL system 107 is still capable of generating and injecting additional messages into the NetFlow message stream 123.

The NF2SL system is preferably designed to take advantage of modern multi-core processors and may be architected as a multi-threaded software or firmware application.

Figure 4:
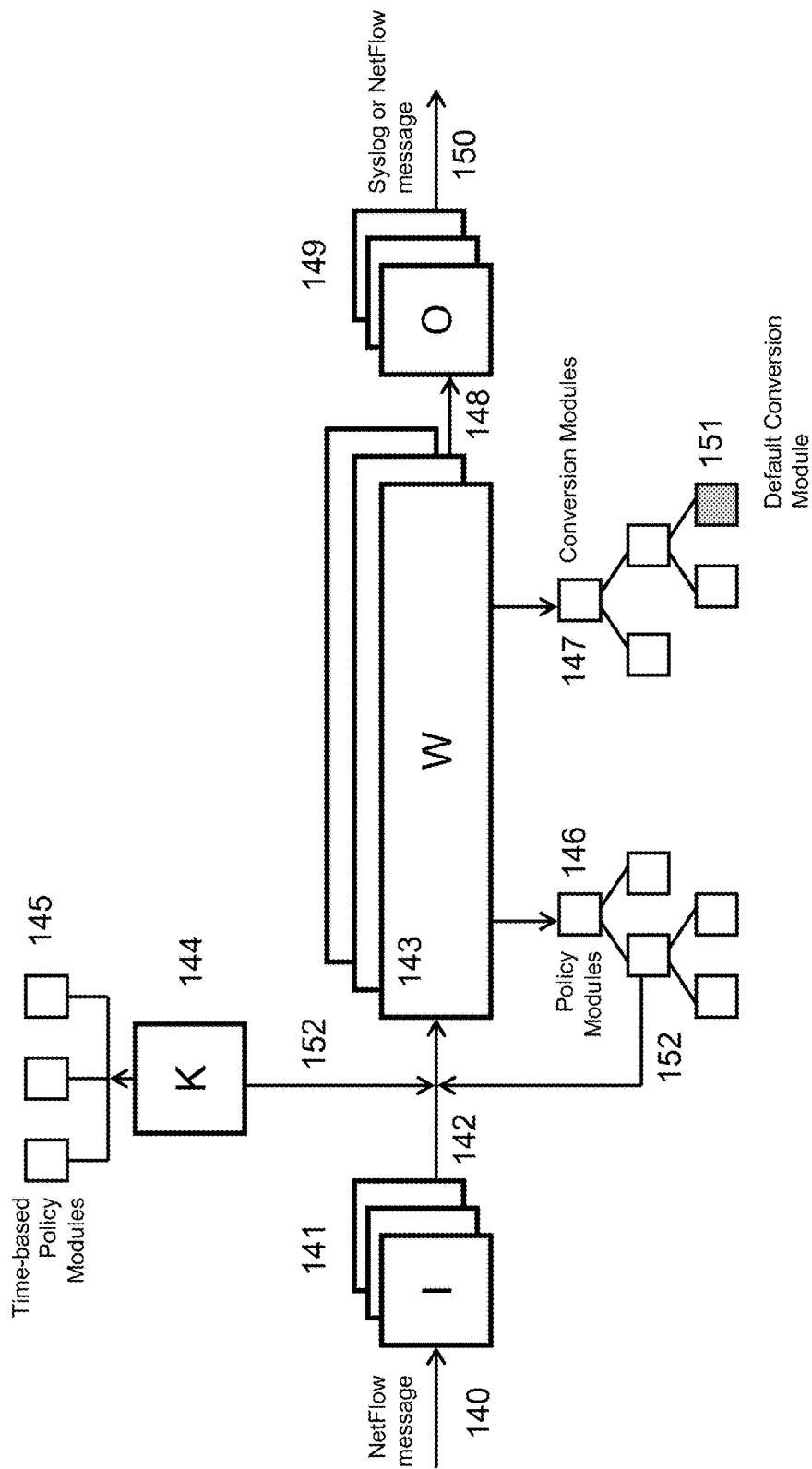
FIG. 4 provides a simplified schematic diagram of a network system including a variety of processing modules that cooperate to analyze metadata in accordance with an embodiment of the present invention.

FIG. 4 depicts an embodiment reflecting an exemplary collection of the NF2SL system's functional components. Referring to FIG. 4, NF2SL Input threads (I) 141 are preferably logic blocks implemented through computer programming code that serve as recipients of the NetFlow messages 140 emitted by NetFlow producers (e.g., routers, switches, etc). There may be one or more Input threads 141 "listening" for the incoming NetFlow messages 140 from multiple NetFlow producers. In one embodiment, all Input threads 141 may be bound to a single UDP socket listening on a configured port.

Upon receiving a NetFlow message 140, an Input thread 141 may perform an initial check on NetFlow message 140 (e.g., by verifying its NetFlow protocol version, minimal NetFlow message size, etc.). If the received packet does not pass the initial check, the Input thread 141 may discard the message or process it in some other appropriate manner. Once the packet passes the initial check, the Input thread 141 may pass it to one of the NF2SL Worker (W) threads 143, which are also preferably logic blocks implemented through computer programming code. The NF2SL system interthread communications may be implemented via a light weight queue mechanism 142, or via any other mechanism known to the art. In general, when a NF2SL thread wants to pass a packet to another thread it may place the packet on the recipient's thread queue. For example, queue mechanism 142 serves the Worker threads 143 and queue mechanism 148 serves the Output threads 149. Upon placing a packet on a queue, the thread sends a signal to the recipient thread that it has a pending job.

The NF2SL system may use the round robin method, or any other mechanism known to the art, when choosing the recipient thread. It will be appreciated that other selection method, such as selection at random or selection according to a defined priority status, could be utilized.

NF2SL Worker threads 143 are responsible for executing policies and format conversion transformations set forth by the NF2SL Administrator. An NF2SL policy is a collection of NetFlow record processing rules. A policy may apply to a specific NetFlow record type, to a group of NetFlow record types or to all NetFlow messages passing through the NF2SL system. Preferably, policies are defined to support and/or complement policies operable in any SIEM system 125 that is operable in the network, as well as policies defining the operation of any syslog and/or NetFlow collectors deployed.

When creating or defining a policy, the NF2SL Administrator may also specify one or more time-based ("kron") policies. NF2SL time-based policies may be executed by the Kron (K) thread 144. It is anticipated that other types of policies besides those described here are also possible—for example, policies triggered by certain event counts, time of day, etc.

The NF2SL Administrator may author policies via a built-in GUI, via an NF2SL software development kit ("SDK") or any other mechanism known to the art. When the GUI method is used, once policy definition is complete, the NF2SL system is configured to generate executable software programs which are able to implement these policies (Policy Modules 146), a corresponding conversion transformation (Conversion Modules 147) and time-based policies (Time-based Policy Modules 145) if such are defined. In an exemplary embodiment, generated software programs may be compiled as dynamically linked libraries (DLL or "shared objects"). These shared objects may be loaded into the NF2SL system at run-time. Alternatively, it is anticipated that policies, conversion transformations and time-based policies may be instantiated as a single executable module rather than a cohesive plurality of executable modules.

The scope of possible NF2SL policies and time-based policies is limited only by the scope of information emitted by the NetFlow producers. For example, consider a NetFlow producer (e.g., a head end router) which reports NetFlow messages containing information about the inbound traffic flows. A corresponding policy may be defined to instruct the NF2SL system to maintain a count of the IP packets destined to a particular http server on the internal network and report cumulative IP packet count to the SIEM system 125 every 60 seconds. SIEM system 125 can utilize such information advantageously to notify the operator about an abnormal network condition. Syslog messages typically delivered to the SIEM system 125 in prior art implementations would not generally contain adequate information to enable the SIEM system 125 to recognize such conditions on the network.

An array of policies may be defined to be applicable to a particular record type, and preferably, each record found in a NetFlow message 140 is evaluated against all policies applicable to that record type. A network administrator may define the order of application of an array of policies that relate to a record type, or other priority logic and/or other logic may be used to define such order. Upon policy evaluation completion, processing module 146 indicates whether NetFlow record processing should continue or the record in question should be discarded. A policy module may also choose to create a new (derivative) NetFlow message which the NF2SL system processes along with or in lieu of one or a plurality of the original NetFlow messages 140 received from the NetFlow producers. In an exemplary embodiment, NetFlow messages created by time-based policies are not subject to evaluation by policies. It is anticipated that in other embodiments of this invention NetFlow messages created by time-based policies may be evaluated by one or a plurality of policies.

In the next step of NetFlow message 140 processing, Worker thread 143 may locate a NetFlow record to syslog packet conversion rule ("Conversion Rule") applicable to this NetFlow record type and invoke a Conversion module 147 to execute a conversion procedure.

An NF2SL Conversion Rule is a collection of instructions which map an original NetFlow record 140 or a derivative NetFlow record 152 to one or more syslog or NetFlow messages 150. Mapping of the information found in a NetFlow record to the information reported via syslog is specified by the NF2SL Administrator via the NF2SL GUI. A simple Conversion Rule example would be reporting the content of all fields in a NetFlow record in a syslog packet 150.

Once Worker thread 143 has applied all relevant Conversion Rules to the records in a NetFlow message 140 it passes the resulting syslog packets to one of the Output (0) threads 149 for delivery to the configured syslog and/or NetFlow message consumers.

It should be appreciated that the number of the Input threads 141, Worker threads 143, and Output threads 149 in the NF2SL system is configurable, and that the NF2SL system is able to process a much higher volume of message traffic because multiple instances of Input threads 141, Worker threads 143, and Output threads 149 may operate in parallel.

NF2SL System Congestion Control Mechanism

Figure 5:
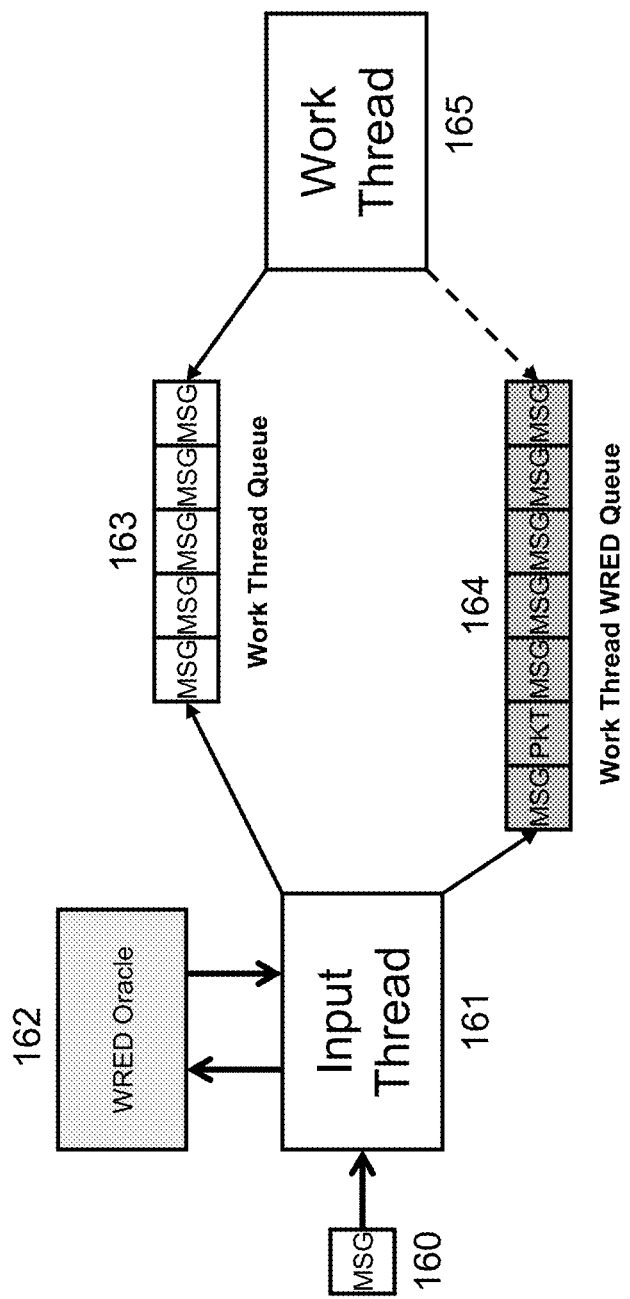
FIG. 5 provides a more detailed schematic diagram of portions of processing modules that cooperate to analyze metadata in accordance with an embodiment of the present invention.

In an exemplary embodiment, in order to accommodate NetFlow traffic bursts, the NF2SL system may include a congestion control mechanism. Referring to FIG. 5, the NF2SL system may use a WRED ("Weighted Random Early Detection") method to determine Work Thread Queue 163 congestion level.

Each Work Thread 165 may have a size-limited immediate Work Thread Queue 163 and an unbounded Work Thread WRED Queue 164. Upon receiving a NetFlow message MSG 160, the Input Thread 161 selects a Work Thread 165 which should process the NetFlow message MSG 160. Work Thread 165 selection may be done in the round robin fashion, or in any other manner deemed advantageous. Once a Work Thread 165 is selected, the Input Thread 161 consults the WRED Oracle 162 which determines on which Work Thread 165 queue the incoming packet should be placed. The WRED Oracle 162 may make this determination based on the current Work Thread Queue 163 length and the computed average queue length according to WRED method guidelines.

Under regular load conditions, the WRED Oracle 162 may instruct the Input Thread 161 to place packets on the Work Thread Queue 163. Under a heavy traffic volume, the WRED Oracle 162 may use a probabilistic approach to determine if the NetFlow message MSG 160 should be placed on the Work Thread Queue 163 or on the Work Thread WRED Queue 164. As traffic volume grows, the probability of a NetFlow message MSG 160 being placed on the Work Thread WRED Queue 164 may increase.

The probability of a NetFlow packet MSG 160 being diverted to the Work Thread WRED Queue 164 may also depend on a weight associated with a particular source of the NetFlow message MSG 160. The NetFlow source's weight may be determined by the NF2SL Administrator.

It should be appreciated that an algorithm other than WRED could be used in the NF2SL system for congestion control purposes. For example, the original RED ("Random Early Detection") algorithm, ARED ("Adaptive Random Early Detection"), Cisco Systems DBL ("Dynamic Buffer Limiting"), etc. could be used to alleviate congestion in the NF2SL system.

NF2SL System NetFlow Traffic Processing Rules

Referring again to FIG. 4, the NF2SL system may include a Default Conversion Module 151 which the NF2SL Administrator may enable for converting NetFlow records which do not have a dedicated Conversion Module 147. The Default Conversion Module 151 may implement a default conversion rule which maps NetFlow record fields as a type specific formatted ASCII string preceded by a field's Net-Flow type id separated by a colon (":"):

<record field id>:<record field value>

FIG. 6 illustrates an exemplary treatment of a NetFlow Data FlowSet record of type R ("record R"), in cases in which record specific policies and conversion rules either are configured or are not configured, and when the Default Conversion Module 151 on FIG. 4 is either enabled or not enabled. It is anticipated that there may be other options for treating NetFlow Data FlowSet records, such as dropping received NetFlow messages when neither policies nor conversion rules or a default conversion rule are configured, etc.

It should be appreciated that popular event reporting protocols do not provide built in mechanisms for ensuring integrity of the delivered information. The NF2SL system provides an advanced feature which is able to append a checksum or other integrity-assuring element to the output messages produced by NF2SL system. A checksum may be a check code such as CRC-16, a message hash such as md5, sha-1, FNV or a part of thereof, or a keyed authentication code such as HMAC. The presence of checksum enables the receiver of the information to validate its authenticity either upon receiving the message or at a later time.

Identifying and Tracking NetFlow v9 Data FlowSet Record Identity

NetFlow v9 protocol, as described in RFC 3954, provided network administrators with a mechanism for creating rich network flows descriptions. This mechanism is based on the concept of Template FlowSets and Options Template FlowSets. A Template is a list of field types and field sizes of a NetFlow data record emitted by a NetFlow producer at run time. For example, a Template field may contain the number of bytes observed in a flow. An Options Template is a list of field types and field sizes of a NetFlow record which contains information about a NetFlow producer. For example, an Options Template field may contain a full name of a NetFlow producer's interface which emits NetFlow information.

A predecessor of the NetFlow v9 protocol called NetFlow v5 defines a single type of data record. It is appreciated that NetFlow v5 record may be described by means of the NetFlow v9 protocol Template facility. This approach allows extending the benefits of NF2SL policy and conversion mechanisms to NetFlow v5 producers.

With the introduction of version 9 of NetFlow, NetFlow messages could be generated with a much greater amount of variability and corresponding information and meaning. For example, a NetFlow version 9 message can include all of the fields of a NetFlow v5 message, and can optionally include additional information such as Multiprotocol Label Switching (MPLS) labels and IPv6 addresses and ports. However, with greater usefulness came greater complexity for a system designed to interpret and use NetFlow v9 messages. The version 9 export format uses templates to provide access to observations of IP packet flows in a flexible and extensible manner. A template defines a collection of fields and field lengths, with corresponding descriptions of structure and semantics.

Some of the useful terms associated with NetFlow v9 are identified and discussed below:

IP Flow or Flow: An IP Flow, also called a Flow, is a set of IP packets passing an Observation Point in the network during a certain time interval. All packets that belong to a particular Flow have a set of common properties derived from the data contained in the packet and from the packet treatment at the Observation Point.

Exporter: An Exporter is a device (for example, a router) with the NetFlow services enabled. The Exporter monitors packets entering an Observation Point and creates Flows from these packets. The information from these Flows is exported in the form of Flow Records.

Export Packet: An Export Packet is a packet originating at an Exporter that carries the Flow Records of this Exporter and whose destination may be a NetFlow Collector or the NF2SL of the present invention.

Packet Header: A Packet Header is the first part of an Export Packet. The Packet Header provides basic information about the packet such as the NetFlow version, number of records contained within the packet, and sequence numbering.

Template Record: A Template Record defines the structure and interpretation of fields in a Flow Data Record.

Template ID: A Template ID is a numeric value temporarily associated with a Template Record.

Template Flow Set: A Template Flow Set is a structure which associates a Template Record with a transient Template ID.

Flow Data Record: A Flow Record provides information about an IP Flow observed at an Observation Point. A Flow Data Record is a data record that contains values of the Flow parameters corresponding to a Template Record.

Data Flow Set: A data Flow Set is a structure which combines one or more Flow Data Records with the same Template ID.

Figure 7:
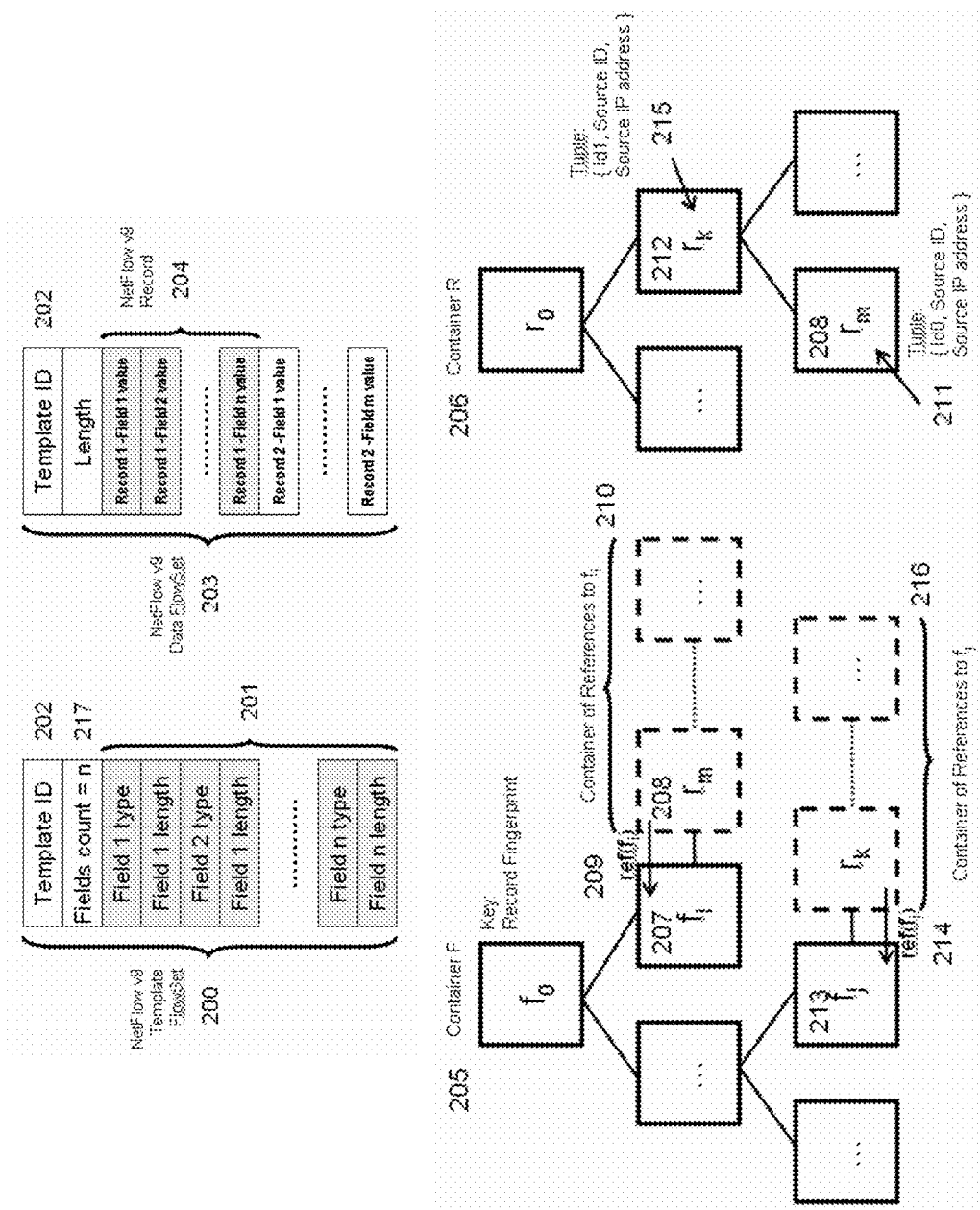
FIG. 7 provides a simplified schematic diagram illustrating the data structure of metadata and a variety of processing modules that cooperate to analyze metadata in accordance with an embodiment of the present invention.

Thus, and referring to FIG. 7, a NetFlow v9 Flow Data Record 204 may not possess a unique identifier which binds a NetFlow v9 Flow Data Record 204 to a well known definition. Instead, a NetFlow v9 Exporter may periodically emit NetFlow v9 Record Template FlowSet 200 identified by a value called Template ID 202. The Template ID 202 record type identifier is not bound to a particular NetFlow v9 Flow Data Record and may change over time, e.g., when the NetFlow Exporter's configuration changes or when the Exporter device reboots. Thus, the definition of the content and meaning of a Flow Data Record 204 is dependent upon a template that can change unpredictably.

An exemplary embodiment of the NF2SL system provides a novel approach to determining and tracking NetFlow v9 Flow Data Record 204 definition and identity. It should be appreciated that the same or a similar method can also be applicable to determining and tracking the identity of the network metadata records for the protocols derived from or similar in this respect to NetFlow v9, such as IPFIX, NetStream, sflowd, etc.

In order to handle changes of the Template ID 202 value, the NF2SL system computes a checksum of NetFlow v9 Template FlowSet section 201. The Template ID field 202 and the Fields Count field 217 need not be included in the checksum. A checksum value computed over the NetFlow v9 Template FlowSet section 201 may be called a "record fingerprint."

Certain NetFlow v9 data types are defined as having variable length (e.g., IF NAME or IF DESC, which contain an interface-shortened name and a full name, respectively). When computing a record fingerprint of a record which contains one or more variable size fields, the length of such fields may be assumed to be 0.

It should be appreciated that a checksum value may be computed using a number of algorithms including but not limited to md5, sha-1, sha-256, FNV, etc. In the exemplary embodiment of FIG. 7, the NF2SL system computes NetFlow v9 Data Flow Record 204 fingerprint using the md5 algorithm.

When registering with the NF2SL system, each converter and policy module may provide a function vector and the md5 fingerprint values of the NetFlow v9 Data FlowSets 203 for which this module implements either a policy or a conversion rule, or both. The NF2SL system can save the fingerprints and the modules' function vectors in Container F 205.

According to the NetFlow v9 protocol, prior to emitting the NetFlow v9 Data FlowSet messages 203 for a given record type, NetFlow v9 Exporters emit a respective Template FlowSet message 200 which associates the subsequent NetFlow v9 Data FlowSet messages 203 with a certain transient Template ID value 202, Id0. The NF2SL system is able to compute a NetFlow v9 Data FlowSet 200 record fingerprint value, fi, and use it as a key for locating an entry corresponding to this particular Template FlowSet 200 in the Container F 205. If a corresponding entry in Container F 205 is found, the NF2SL system can create Object rm 208 in the Container R 206.

In order to identify multiple NetFlow v9 Exporters, the NF2SL system can use NetFlow v9 Exporter's Source ID and Source IP address along with the transient Template ID 202, Id0. This information may be stored as a {Id0, Source ID, Source IP address} tuple 211 in Object rm 208.

Besides the {Id0, Source ID, Source IP address} tuple 211, Object rm 208 also may have a reference ref(fi) 209 to Object fi 207 in Container F 205 with which Object rm 208 is associated. If more than one object in Container R 206 is associated with Object fi 207, then references to these objects in Container R 206 are collected and placed in Container of References to fi 210.

In an exemplary embodiment, Container F 205 and Container R 206 are implemented as AVL trees. The Container of References to fi 210 is implemented as a sorted list. It will be appreciated that Container F 205, Container R 206 and the Container of References to fi 210 could be implemented in a different fashion such as a hash table, linked list, red-black tree, etc.

In an exemplary embodiment, when the NF2SL system receives a NetFlow v9 Data FlowSet 203 with Template ID 202 value Id0, it looks up a {Id0, Source ID, Source IP address} tuple 211 in Container R 206 and uses reference ref(fi) 209 for locating Object fi 207 in Container F 205. Object fi 207 may contain a function vector of a policy module which enforces policies applicable to the NetFlow v9 Data FlowSet 203. The same lookup procedure is repeated to locate and execute a conversion rule applicable to NetFlow v9 Data FlowSet 203.

It will be appreciated that the following scenarios may be considered when for a known Source ID, SID, and Source IP address, SRC, a new NetFlow v9 Template FlowSet 205 Template ID 202 is introduced. It is useful to note that a Data Flow Record 204 fingerprint value computed over the NetFlow v9 Template FlowSet section 201 does not change and Object fi 207 could be readily located in Container F 205.

Scenario 1: NetFlow v9 producer changes Template FlowSet fi Template ID 202 from Id0 to Id1

In this case, the tuple {Id1, SID, SRC} 211 is not present in Container R 206. The NF2SL system can create Object rk 212 holding the tuple {Id1, SID, SRC} 215 and insert it into Container R 206 and into Container of References to fi 210. A previously existing object associated with the tuple {Id0, SID, SRC} may be removed from Container of References to fi 210 and Container R 206 during an idle objects clean up procedure at a later time or immediately after insertion of the tuple {Id1, SID, SRC} 215 into Container R 206 and into Container of References to fi 210.

Scenario 2: NetFlow v9 producer introduces Template FlowSetfj with Template ID Id1 that is the same as that of a previously known Template FlowSet fi Template ID (the latter is no longer in use)

In this case, the tuple {Id0, SID, SRC} 211 is already present in Container R 206 in Object rk 212. The NF2SL system locates Object rk 212 in Container R 206 and deduces that it is referencing a different Template FlowSetfj 213 rather than the previously referenced Template FlowSet fi 207. The NF2SL system may detect a mismatch by comparing the fingerprint value of Template FlowSet fi 207 and Template FlowSetfj 213. Then the NF2SL system removes Object rk 212 from Container of References to fi 211, removes reference ref(fi) 209 and replaces it with reference ref(fj) 214 pointing to Object fj 213. It may also insert Object rk 212 into Container of References to fj 216.

Scenario 3: NetFlow v9 producer refreshes Template FlowSet fi Template ID 202 without changing the value Id0

In this case, the tuple {Id0, SID, SRC} 211 is already present in Container R 206 in Object rm 212. The NF2SL system locates Object rm 212 in Container R 206 and deduces that it is referencing the same Template FlowSet fi as previously. The NF2SL system takes no further action.

Registering NetFlow Data FlowSet Objects with the NF2SL System

The NetFlow protocol versions prior to v9 support only a single data type per version. These data types may be registered in the NF2SL system based on their respective documented descriptions.

TAs discussed above, the NetFlow v9 protocol, its derivatives and successors, support arbitrary data types. These data types are described by means of the NetFlow v9 Template FlowSet construct.

In order for a NetFlow v9 Data FlowSet to be converted into one or more syslog messages, a Data FlowSet definition must be made known to the NF2SL system. In an exemplary embodiment, the NF2SL system uses the following methods for capturing NetFlow v9 Data FlowSet definitions:

1. According to the NetFlow v9 protocol, prior to exporting Data FlowSets, NetFlow v9 producers must emit Template FlowSet and Options Template FlowSet messages which describe the NetFlow v9 Data FlowSet objects to be exported. The NF2SL system may capture NetFlow v9 Template FlowSet messages exported by the NetFlow producers and preserve them in an internal XML representation.
2. NetFlow v9 producers (e.g., Cisco IOS, Juniper Networks JunOS, etc.) provide a comprehensive command line interface for configuring and exportingNetFlow v9 information. The NF2SL system supports extracting NetFlow related configuration from a NetFlow producer and converting it into an internal XML representation.
3. The NF2SL system provides a GUI tool for spelling out NetFlow v9 Data FlowSet definitions. The definitions of NetFlow v9 Data FlowSets are stored in an internal XML representation.

Once a NetFlow v9 Template FlowSet record definition is captured, the NF2SL Administrator may use this definition for specifying NetFlow v9 Data FlowSets information mapping to a syslog packet and/or for defining policies for this NetFlow v9 Data FlowSet processing.

It is anticipated that other embodiments of the NF2SL system may implement other than the described above methods of capturing NetFlow v9 Data FlowSet definitions.

NF2SL Policy and Conversion Mechanisms

Figure 8:
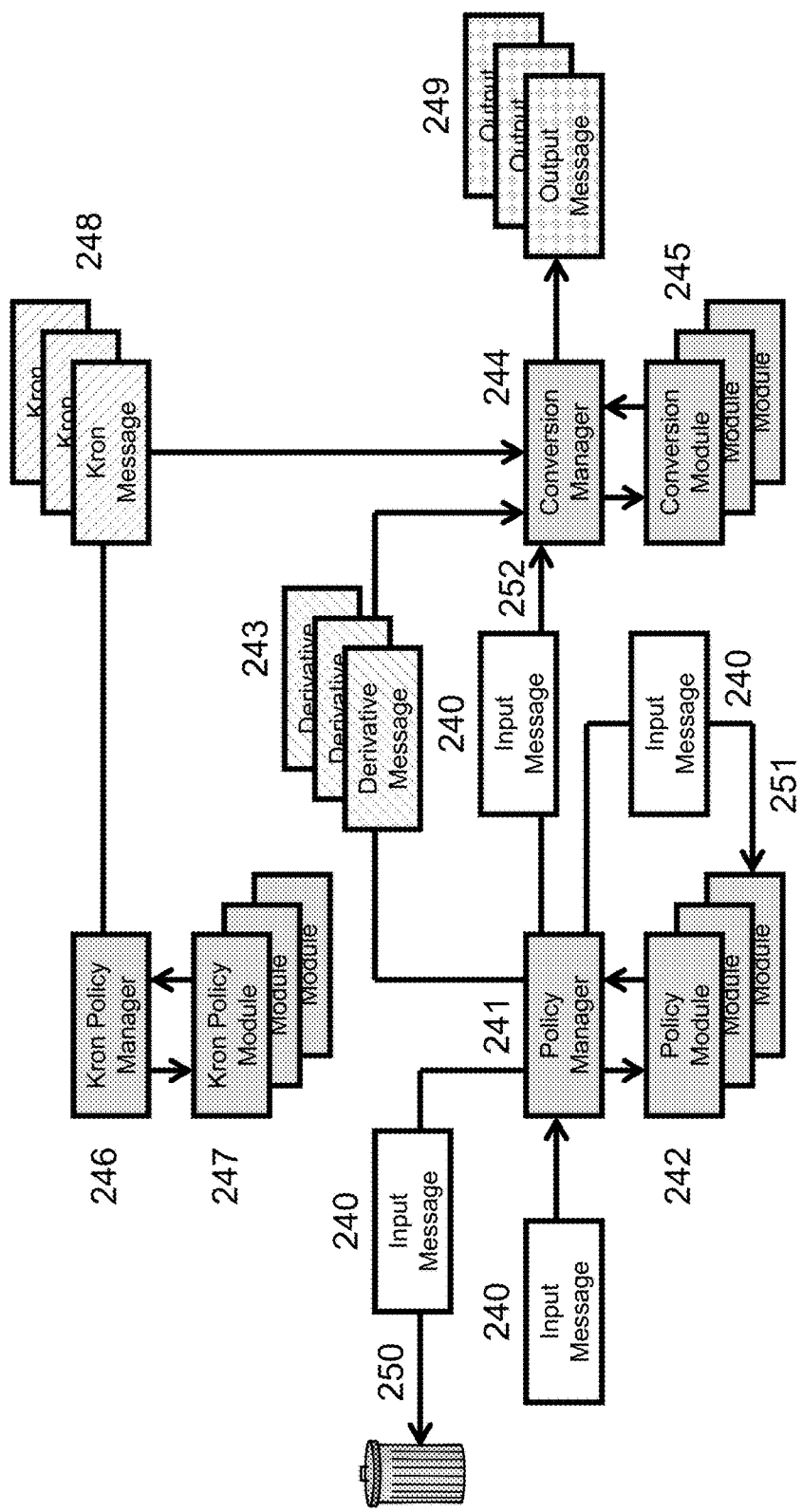
FIG. 8 provides a simplified schematic diagram of a variety of processing modules that cooperate to analyze metadata in accordance with an embodiment of the present invention.

Referring to FIG. 8, in an exemplary embodiment the NF2SL system allows the NF2SL Administrator to create policies which affect how NetFlow Data FlowSet objects traversing the NF2SL system are processed. An NF2SL system policy may be content based ("content policy"), time based ("kron policy") or based upon other factors. In the NF2SL system, the policies may be managed by the NF2SL Policy Manager 241 and enforced by executable Policy Modules 242.

In an exemplary embodiment, the NF2SL system Policy Modules 242 are dynamically loaded executable extensions (DLL or "shared objects") which preferably provide a standardized interface. The NF2SL Policy Manager 241 dynamically loads Policy Modules 242 and can discover their interface functions vector by calling a well known entry point function. A Policy Module 242 functions vector may contain arrays of function pointers to the functions which implement content-based and time-based policy functions contained in the loaded Policy Module 242.

The NF2SL Policy Manager 241 applies policies to NetFlow Data FlowSet objects which match that Data FlowSet record fingerprint. There may be zero or more content-based policies per Data FlowSet. Content-based policies are applied to a Data FlowSet in the order of priority assigned to each content based policy by the NF2SL Administrator.

The NF2SL Policy Manager 241 can parse a Data FlowSet submitted in the Input Message 240 and pass 251 each NetFlow record found in the Data FlowSet to relevant Policy Modules 242. Upon processing a NetFlow record, a Policy Module 242 may determine that zero or more NetFlow records in the Input Message 240 in question should be forwarded for further processing 252, mark a NetFlow record as unsuitable for further consideration 250, purposely amend NetFlow record data to obfuscate sensitive information or create one or more Derivative Messages 243. In order to avoid possible cyclic processing, Derivative Messages created by the NF2SL Policy Modules 242 need not be matched against the NF2SL content based policies and may be forwarded directly to the NF2SL Conversion Manager 244.

Time-based ("kron") policies may be invoked periodically by the NF2SL Kron Policy Manager 246. The kron policies are enforced by the Kron Policy Modules 247. The frequency of a kron policy invocation may be stipulated at the time of a kron policy registration with the NF2SL Kron Policy Manager 246. A kron policy may perform arbitrary actions on the information which it manages and in addition emit one or more Kron Messages 248. Kron Messages 248 generally need not be matched against the NF2SL content based policies and may be forwarded directly to the NF2SL Conversion Manager 244, although alternative behaviors are also possible.

In this embodiment of the NF2SL system, conversion rules are managed by the NF2SL Conversion Manager 244 and are implemented by executable Conversion Modules 245.

In an exemplary embodiment, the NF2SL system Conversion Modules 245 are dynamically loaded executable extensions (DLL or "shared objects") which preferably provide a standardized interface. The NF2SL Conversion Manager 244 dynamically loads Conversion Modules 245 and discovers their interface functions vector by calling a well known entry point function. A Conversion Module 245 functions vector contains function pointers to the functions which convert NetFlow Data FlowSet records found in the Input Messages 240, Derivative Messages 243 and Kron Messages 248 into one or more syslog Output Messages 249.

NF2SL Policies and Conversion Rules Representation

Figure 9:
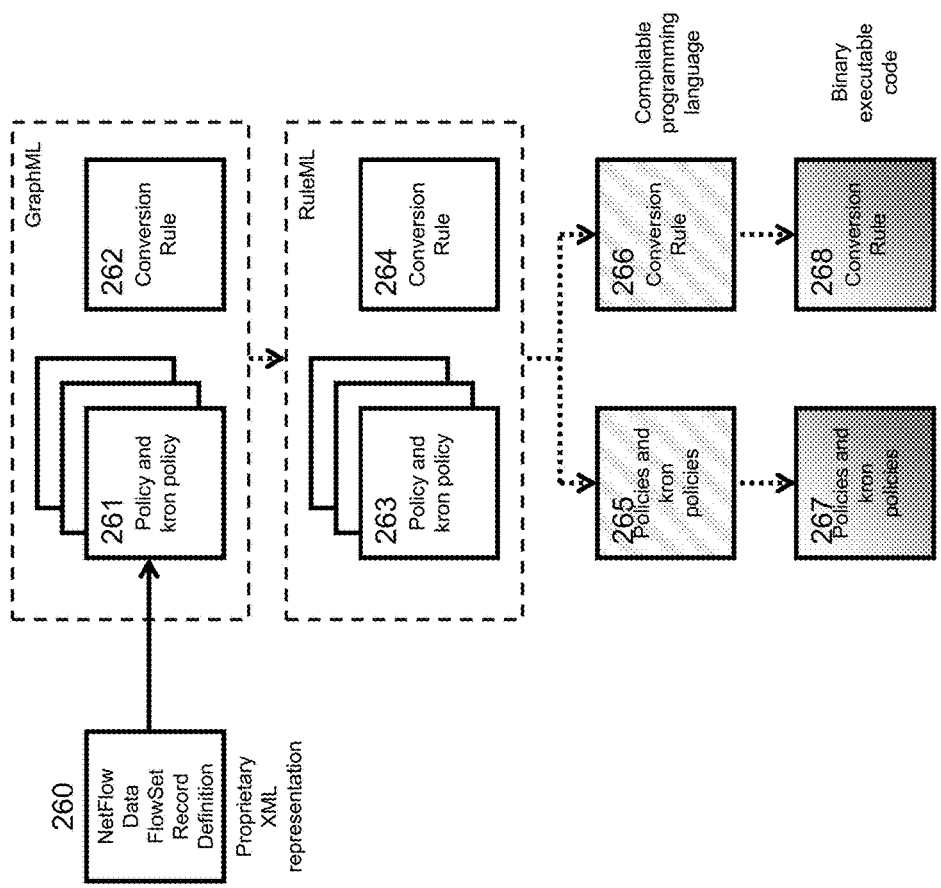
FIG. 9 provides a simplified block diagram and flow chart illustrating a variety of processing modules that cooperate to analyze metadata in accordance with an embodiment of the present invention.

Referring to FIG. 9, NetFlow Data FlowSet record definition 260 may be utilized in the policy and conversion rule creation procedure. In the NF2SL system, NetFlow Data FlowSet records may be uniquely identified by a checksum value computed over that record's NetFlow v9 style Template FlowSet definitions. A NetFlow v5 record may be modeled by a NetFlow v9-style Template FlowSet as well. In an exemplary embodiment, NF2SL uses an XML format for representing a NetFlow Data FlowSet record definition 260.

After creating a NetFlow Data FlowSet record definition 260, the NF2SL Administrator may use a GUI tool or an NF2SL SDK to create policies and a conversion rule. The NF2SL Administrator may create a graphical representation of the Policies and kron policies 261 and Conversion Rule 262. The NF2SL system translates that graphical representation into a textual representation using GraphML XML syntax.

Once a graphical representation of the Policy and kron policy 261 and the Conversion Rule 262 is complete, a GraphML notation may be translated into a sequence of rules describing Policy and kron policy 263 and the Conversion Rule 264. The sequence of rules may be written using the RuleML syntax.

A RuleML representation of the Policy and kron policy 263 and the Conversion Rule 264 may be translated into an equivalent sequence of rules written in a machine programming language which may be compiled into a binary representation and then efficiently executed. The result of translation is two modules which describe the Policies and kron policies 265 and the Conversion Rule 266 in the programming language terms. The result of subsequent compilation is two binary executable modules which implement the Policies and kron policies 267 and the Conversion Rule 268.

In an exemplary embodiment, the NF2SL system uses the "C" programming language as a machine programming language of choice when presenting the Policies and kron policies 265 and the Conversion Rule 266 in the programming language terms. It will be appreciated that the Policies and kron policies 265 and the Conversion Rule 266 and the Policies and kron policies 267 and the Conversion Rule 268 may be integrated into a single object rather than being a plurality of objects.

It will also be appreciated that syntax other than GraphML, RuleML and the "C" programming language may be used to express the policies and the conversion rule. A useful aspect of a preferred embodiment of this invention is a proposition of dedicated executable modules for implementing the policies and the conversion rule. This aspect of the embodiment assures at least an order of magnitude faster performance compared to the similar in purpose systems which interpret the input data.

NF2SL Policies

NF2SL content-based policies are generally associated with NetFlow traffic emitted by the external NetFlow producers, while time-based policies typically deal with the data resulting from processing of the original NetFlow traffic and emit additional NetFlow information. It should be appreciated that the following NF2SL policies, policy parameters and policy implementations are exemplary and may be carried out in ways other than those expressly described here.

Figure 9A:
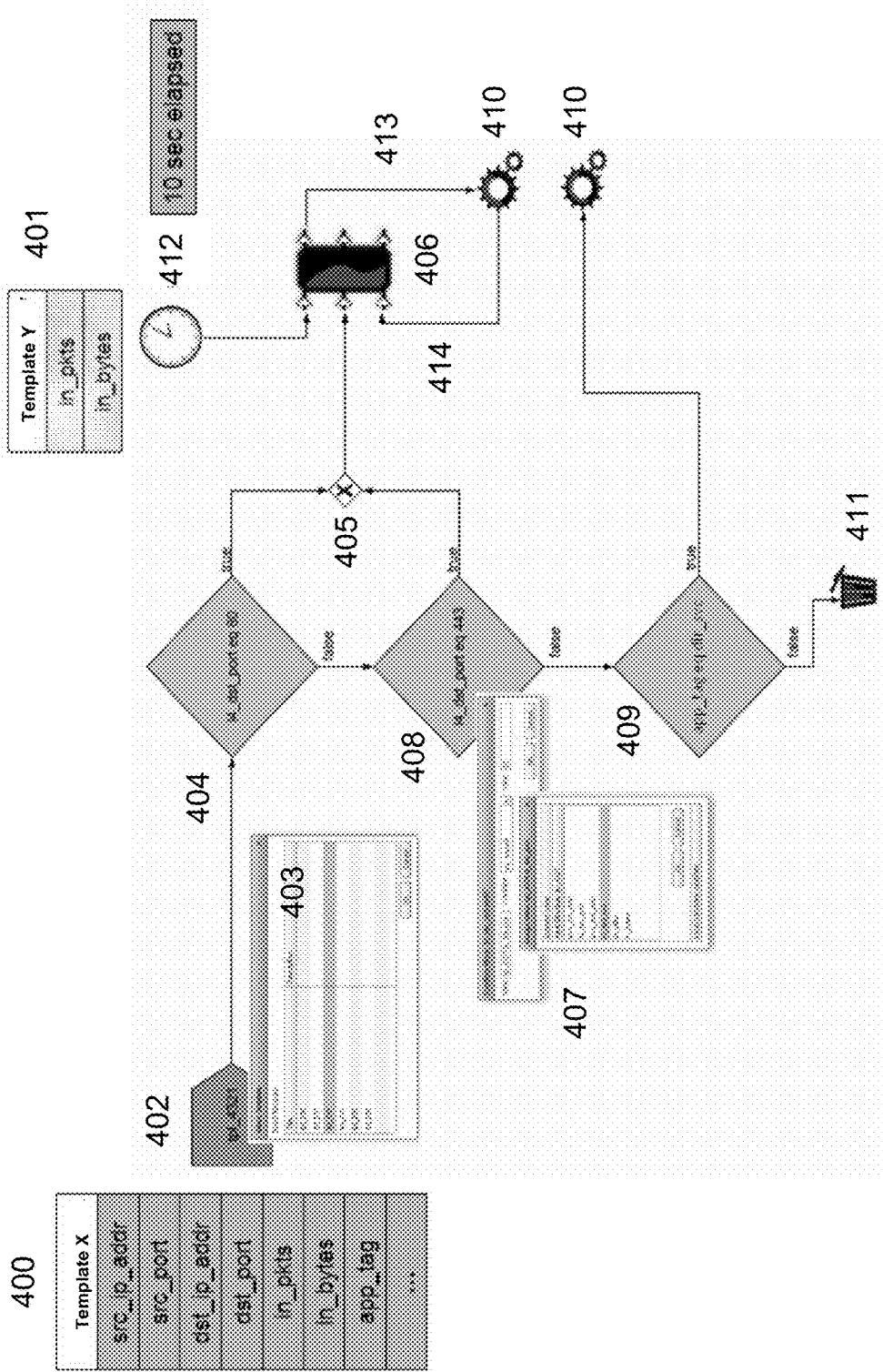
FIG. 9a provides a simplified block diagram and flow chart illustrating a policy that can be implemented in accordance with an embodiment of the present invention.

FIG. 9a illustrates an exemplary content-based policy for a NetFlow Template X 400 and an exemplary time-based policy which emits a NetFlow Template Y 401. NetFlow Template X 400 contains the following exemplary fields:

src_ip_addr—flow source IP address
    src_port—flow source port
    dst_ip_addr—flow destination IP address
    dst_port—flow destination port
    in_pkts—the number of packets in the flow
    in_bytes—the number of bytes in the flow
    app_tag—id of an application associated with the flow Template X 400 may have other fields not relevant to this example.

Using pseudocode syntax, the content-based filtering policy may be expressed as the following:

```
for all Data FlowSet records of type X:
if (dst_port == 80 or dst_port == 443) {
    accumulatein_pkts counter;
    accumulatein_bytes counter;
    ignore record;
}
else if (application == directory_service) {
    report event;
}
else ignore record;
```

The above pseudocode corresponds to the following human readable policy description:

"Observe Data FlowSet record of type X.

If the record describes a flow to a web service ("http: 80" or "https: 443") then add up the number of packets in the flow and the number of bytes observed in the flow to a total number of previously observed packets and bytes destined to the web services. Do not forward the record.

If the record describes a flow to a directory service then forward the record.

Otherwise do not forward the record."

In an embodiment of the invention, an NF2SL administrator is able to create a definition of the above policy using an NF2SL GUI tool. In a first step, the NF2SL administrator can formulate the content of Template X 400 by means of the Template Builder Tool 403 and designates Template X 400 as a subject data type of a content-based policy by associating Template X 400 with the Policy Entry Object 402.

In the next step, the NF2SL administrator can create Conditional Object 404, which evaluates if the Template X 400 dst_port field value is equal to 80 ("http"). In case the evaluation yields "true," then the values found in the Template X 400 "in_pkts" and "in_bytes" fields are forwarded to the Accumulator Object 406 via the Summation Object 405.

In the next step, the NF2SL administrator can create Conditional Object 408 which evaluates if the Template X 400 "dst_port" field value is equal to 443 ("https"). In case the evaluation yields "true," then the values found in the Template X 400 "in_pkts" and "in_bytes" fields are forwarded to the Accumulator Object 406 via the Summation Object 405. When creating Conditional Objects 404 and 408, the NF2SL administrator can utilize the Conditional Object Builder 407.

In the next step, the NF2SL administrator can create Conditional Object 409, which evaluates if the Template X 400 "app_tag" field contains a value associated with a directory service. In case the evaluation yields "true," then the record is forwarded to further processing 410.

All records except those satisfying the criteria of Conditional Object 409 are not subject to further processing and are dropped 411.

Such an exemplary time-based policy can be executed every 10 seconds and emits a NetFlow Data FlowSet record corresponding to the NetFlow Template Y 401. Further referring to FIG. 9a, NetFlow Template Y 401 contains the following exemplary fields:

in_pkts—a cumulative number of packets observed in the flows
    in_bytes—a cumulative number of bytes observed in the flows When invoked, the Time-based Policy 412 retrieves values found in the Accumulator Object 406 and resets values of the counters 414. Then the Time-based Policy 412 formats a data record which corresponds to the NetFlow Template 401 and forwards it for further processing 410.

NF2SL Policy: Detecting and Reporting Traffic Spikes

Figure 9B:
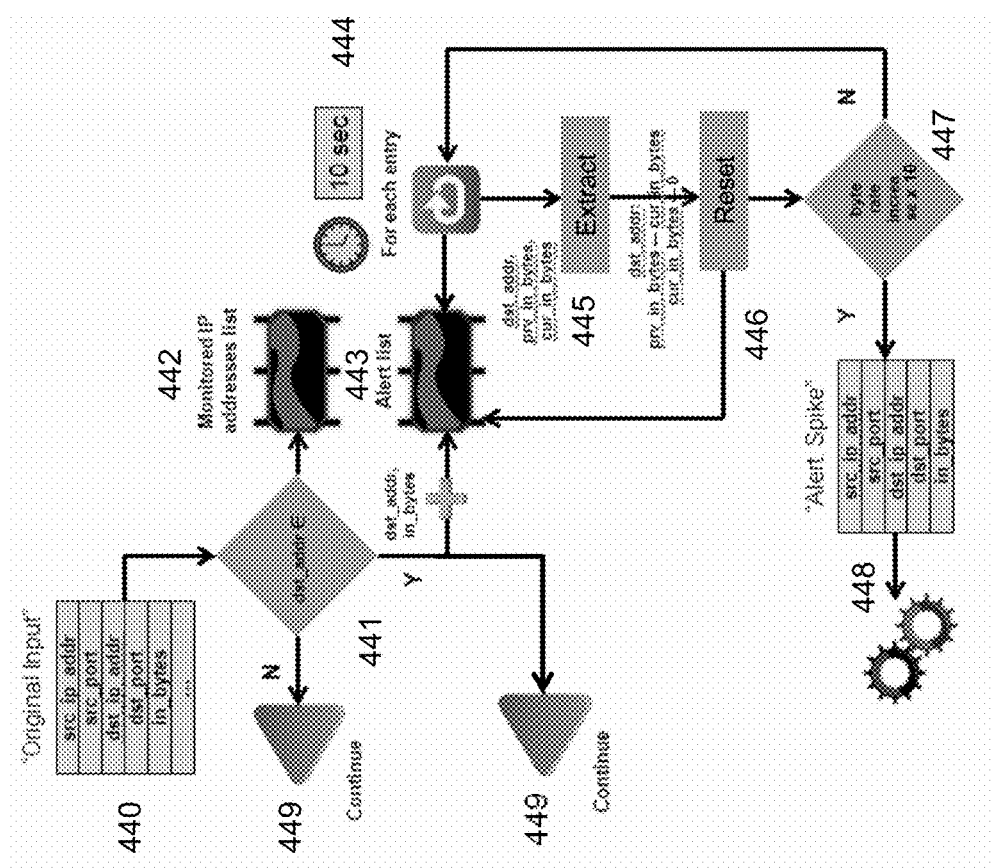
FIG. 9b provides a simplified block diagram and flow chart illustrating another policy that can be implemented in accordance with an embodiment of the present invention.

FIG. 9b illustrates an exemplary NF2SL policy module which reports spikes in the traffic to certain network hosts designated by the NF2SL administrator.

The content-based policy of this NF2SL exemplary policy module takes Cisco Systems pre-defined "Original Input" NetFlow DataFlow record 440 and uses Conditional Object 441 for making a determination if the dst_ip_addr field of the record 440 contains an IP address present in the list of monitored IP addresses 442. If the IP address is found in the list of the monitored IP addresses then the content of the in_bytes field is added to a corresponding entry found in the Collector Object 443 and the record is forwarded for further processing 449. If the IP address is not found in the list of the monitored IP addresses the record is forwarded for further processing 449.

The NF2SL system may invoke the time-based policy 444 of this NF2SL exemplary policy module at predefined intervals, e.g., every 10 seconds. Upon invocation the policy examines one by one the entries in the Collector Object 443 and extracts 445 traffic volume to a network device observed during last collection interval. Then time-based policy 444 resets the entry 446 in the Collector Object 443.

If the time-based part policy 444 Conditional Object 447 discovers that, compared with the average traffic volume, the traffic rate to that network IP address during the observed interval increased by a measure set forth by the NF2SL administrator (e.g., by an order of magnitude) then the time-based policy 444 may generate and format a NetFlow Data FlowSet record according to the "Alert: Spike" definition 448 and forward that record for further processing.

NF2SL Policy: Detecting Compromised Hosts on the Internal Network

Figure 9C:
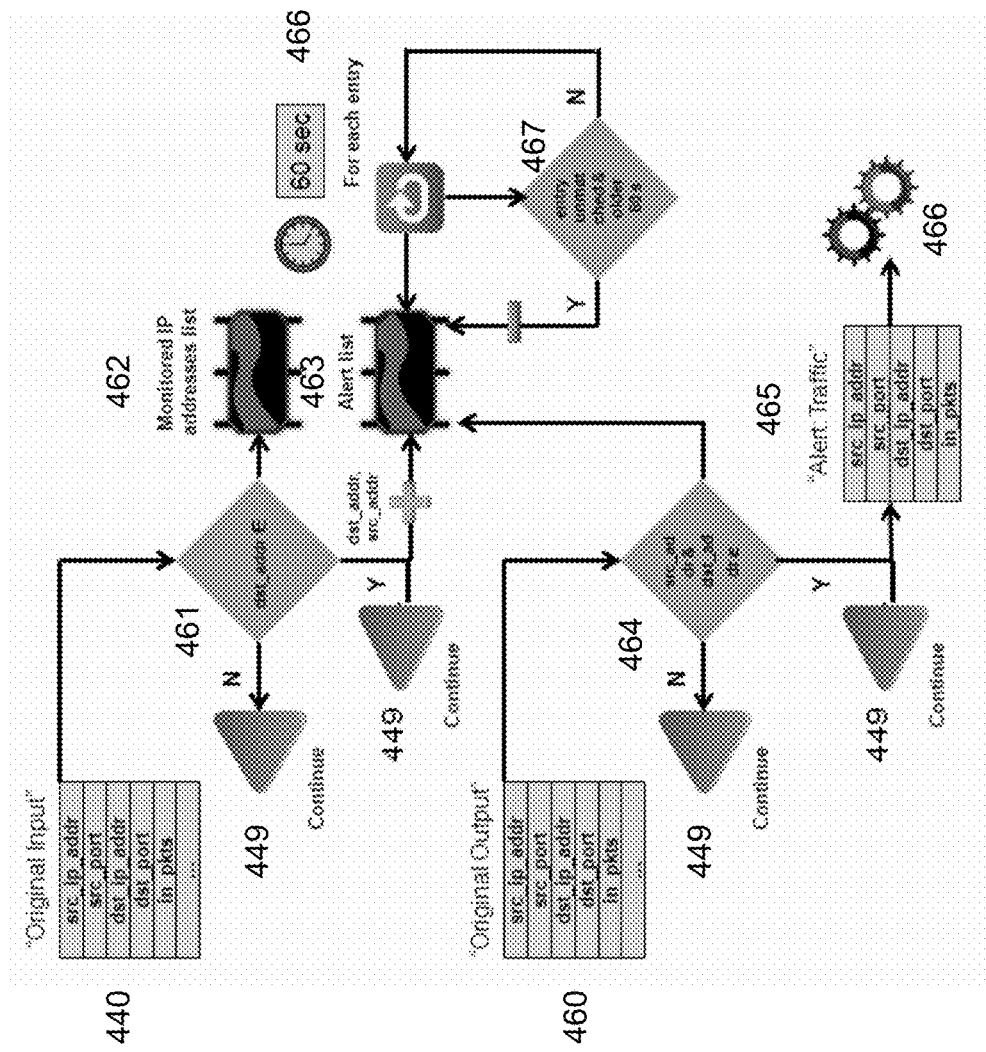
FIG. 9c provides a simplified block diagram and flow chart illustrating another policy that can be implemented in accordance with an embodiment of the present invention.

FIG. 9c illustrates an exemplary NF2SL policy module which alerts network administrators about compromised network hosts on the internal network. This policy module monitors the occurrences when a non-server network host on the internal network responds to an unsolicited connection made by an external network entity. Such event with high probability indicates that the non-server network host in question is compromised and may be under the control of a malicious external entity.

First, the content-based policy of this NF2SL exemplary policy module takes Cisco Systems pre-defined "Original Input" NetFlow DataFlow record 440 and uses Conditional Object 461 for making a determination if the dst_ip_addr field of the record 440 contains an IP address present in the list of monitored IP addresses 462. If the IP address is found in the list of the monitored IP addresses, then the content of the dst_ip_addr, dst_port, src_ip_addr and src_port fields is placed in the Collector Object 463 and the record is forwarded for further processing 449. If the IP address is not found in the list of the monitored IP addresses, the record is simply forwarded for further processing 449.

Second, the content-based policy of this NF2SL exemplary policy module takes Cisco Systems pre-defined "Original Output" NetFlow DataFlow record 460 and uses Conditional Object 464 for making a determination if the src_ip_addr, src_port, dst_ip_addr and dst_port fields of the record 460 are present in the Collector Object 463. If the src_ip_addr, src_port, dst_ip_addr and dst_port fields of the record 460 are not present in the Collector Object 463 then the record is simply forwarded for further processing 469. If the src_ip_addr, src_port, dst_ip_addr and dst_port fields of the record 460 are present in the Collector Object 463 then the second policy may generate and format an "Alert: Traffic" NetFlow record 465 which contains information about the observed communication between an internal network host and an outside entity and forward it for further processing 466. It may also mark the entry as matched. The "Original Output" record 460 may also be forwarded for further processing 469.

The NF2SL system invokes the time-based policy 466 of this NF2SL exemplary policy module at predefined intervals, e.g., every 60 seconds. The time-based policy 466 may access entries in the Collector Object 463 and use the Conditional Object 467 to evaluate if an entry in the collector object is unmatched, and remove unmatched entries older than 60 seconds from the Collector Object 463.

NF2SL Policy: Detecting "Low and Slow" Network Scans

Target network scanning is often a first stage of any advanced cyber attack. Intruders use network scanning to identify active hosts on a network. While scanning a network, the attacker finds information about the specific IP addresses that can be accessed over the Internet, their operating systems, the system architecture, and the services running on each computer.

So called "low and slow" scans are notoriously hard to detect. An attacker may take days, weeks or even months to scan a target host or network. This scanning technique allows the attacker to blend his probes into the network noise, never exceeding detection thresholds or exhausting the resources of regular intrusion detection systems.

Network scanning with TCP/IP FIN packets is one of the most sophisticated scanning techniques. Due to the nature of the TCP/IP protocol, FIN packets are capable of passing through firewalls with no modification to their purpose. In response to an unsolicited FIN packet, closed ports reply with an appropriate RST packet, while open ports ignore a stray FIN packet.

Figure 9D:
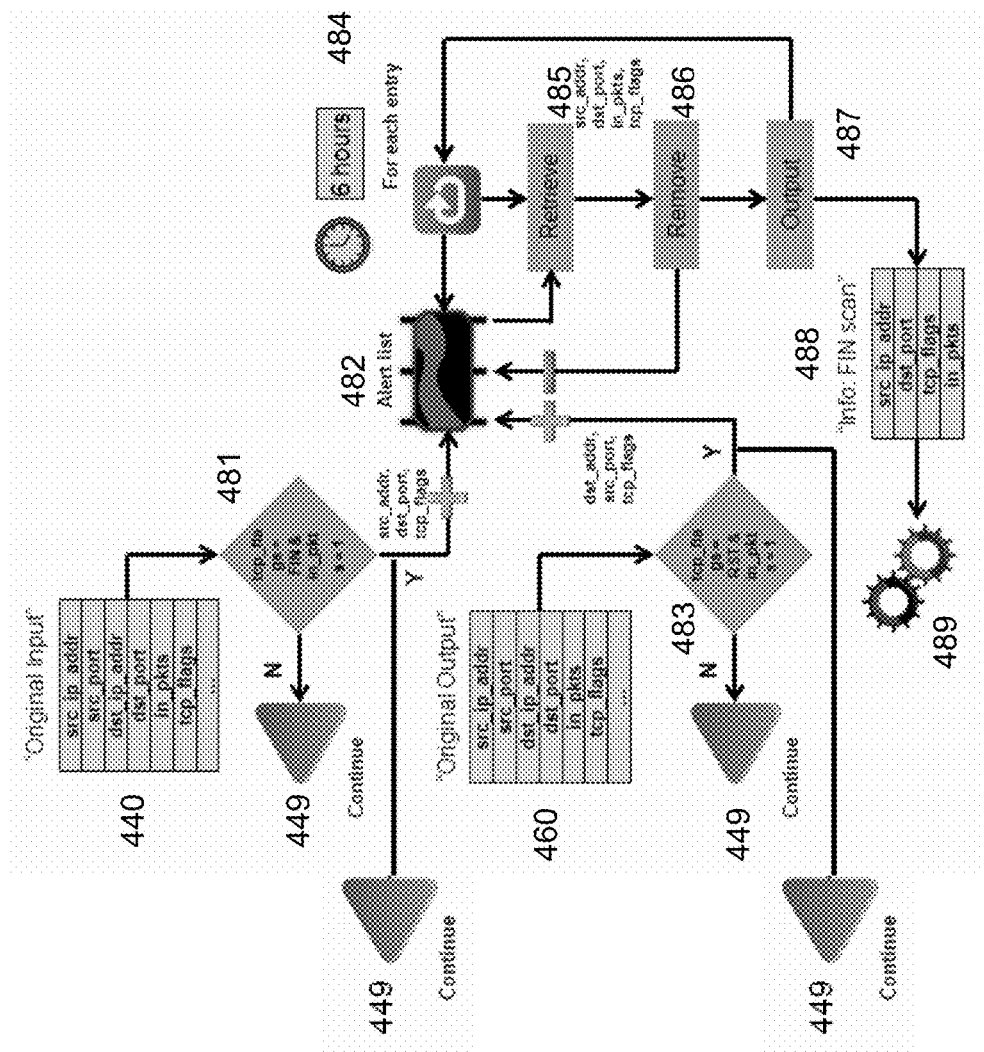
FIG. 9d provides a simplified block diagram and flow chart illustrating another policy that can be implemented in accordance with an embodiment of the present invention.

FIG. 9d illustrates an exemplary NF2SL policy module which can inform network administrators about potential attempts of low and slow scans while consuming minimal NF2SL system and other network resources.

First, a content-based policy of this NF2SL exemplary policy module takes Cisco Systems pre-defined "Original Input" NetFlow DataFlow record 440 and uses Conditional Object 481 for making a determination if a flow consisted of a single packet which had a TCP/IP flag FIN set. If this condition evaluates to "true" then the src_ip_addr, src_port, dst_ip_addr, dst_port and tcp_flag fields of the "Original Input" NetFlowDataFlow record 440 are preserved in the Collector Object 482 and the record is forwarded for further processing 449. If the condition evaluates to "false" the record is simply forwarded for further processing 449.

Second, the content-based policy of this NF2SL exemplary policy module takes Cisco Systems pre-defined "Original Output" NetFlow DataFlow record 460 and uses Conditional Object 483 for making a determination if a flow consisted of a single packet which had a TCP/IP flag RST set. If this condition evaluates to "true" then the dst_ip_addr, dst_port, src_ip_addr, src_port and tcp_flag fields of the "Original Output" NetFlow DataFlow record 460 are matched with the entries in the Collector Object 482. If a matching entry is located, the tcp_flag fields of the "Original Output" NetFlow DataFlow record 460 and the "Original Input" NetFlow DataFlow record 440 are logically OR'ed and the record is forwarded for further processing 449. If a matching entry is not located, the record is simply forwarded for further processing 449.

The NF2SL system invokes the time-based policy 484 of this NF2SL exemplary policy module at predefined intervals, e.g., every 6 hours. The time-based policy 484 retrieves 485 and removes 486 each record from the Collector Object 482 and outputs 487 the records in the "Info: Fin scan" NetFlow Template 488 format. The output records in the "Info: Fin scan" NetFlow Template 488 format are forwarded for further processing 489.

NF2SL Policy: Network Monitoring

Network monitoring is a fundamental component of contemporary Network Management Systems (NMS). It is imperative for network administrators to know the exact network topology, health or condition of each network device, traffic load on various network segments, network bandwidth consumption by various applications, etc.

Figure 9E:
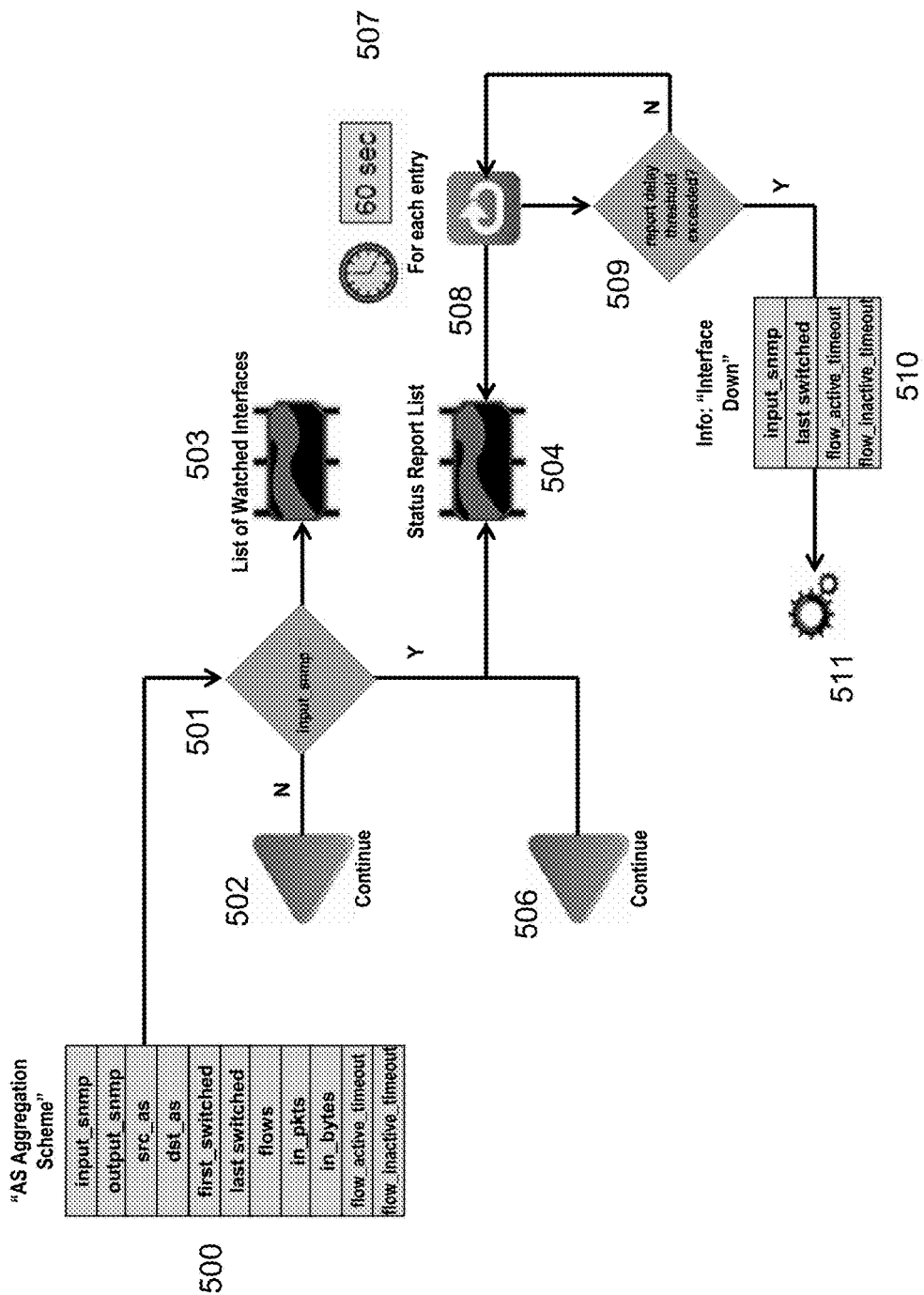
FIG. 9e provides a simplified block diagram and flow chart illustrating another policy that can be implemented in accordance with an embodiment of the present invention.

Interface Condition Monitoring:

FIG. 9e illustrates an exemplary NF2SL policy module which is able to monitor the health or condition of one or a plurality of network interfaces across one or a plurality of network devices.

Referring to FIG. 9e, a content-based policy which monitors one or a plurality of the network device interfaces makes a decision based on a sequence of the "AS (Autonomous System) aggregation scheme" Flow Records 500 ("report"). This policy uses a Conditional Object 501 to make a decision if an input interface ("input_snmp") is included in a List of Watched Interfaces 503. If the interface is not on the List of Watched Interfaces 503, then Record 500 is forwarded for a further processing 502. If the interface is on a watched interfaces list, then timing information ("last_switched") contained in Record 500 about the flows observed on the interface is propagated into the Status Report List 504 and Record 500 may be forwarded for further processing 506.

Further referring to FIG. 9e, an exemplary time-based policy 507 may also be invoked at regular intervals, e.g., every 60 seconds. This policy is able to read entries 508 in the Status Report List 504 and if Conditional Object 509 detects that a preset report delay threshold is exceeded, then time-based policy 507 generates a custom informational Flow Record "Interface Down" 510 which is forwarded for further processing 511.

Figure 9F:
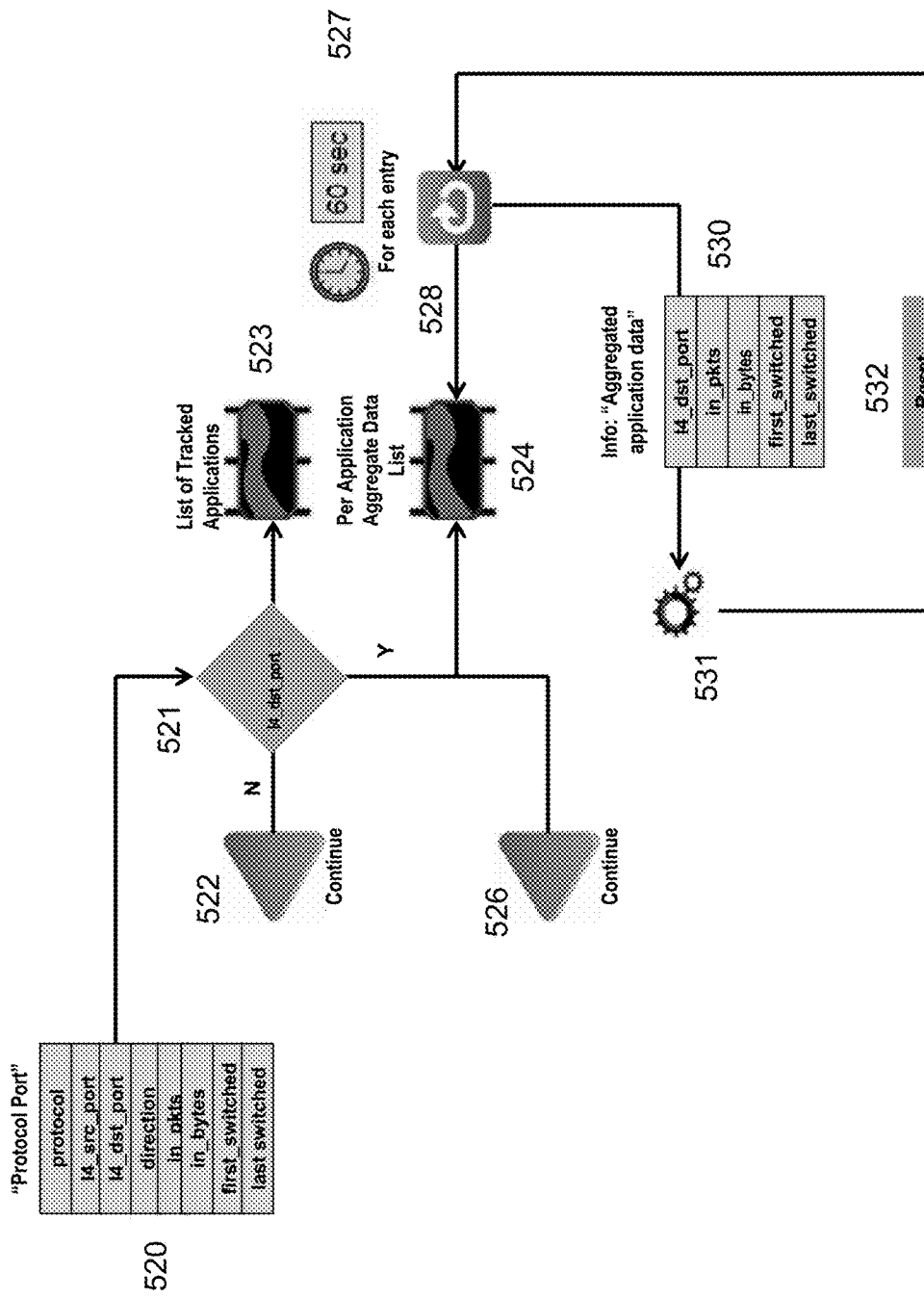
FIG. 9f provides a simplified block diagram and flow chart illustrating another policy that can be implemented in accordance with an embodiment of the present invention.

Bandwidth Consumption Monitoring:

FIG. 9f illustrates an exemplary NF2SL policy module which is able to monitor network bandwidth consumption by one or a plurality of software applications.

Referring to FIG. 9f, a content-based policy which assesses network bandwidth consumption by one or a plurality of software applications utilizes a pre-defined Cisco Systems "Protocol Port" Flow Records 520. This policy uses a Conditional Object 521 to make a decision if application (as defined by "l4_dst_port" for ingress traffic or "l4_src_port" for egress traffic) is included in a List of Tracked Applications 523. If the application is not on the List of Tracked Applications 523, then Record 520 may simply be forwarded for further processing 522. If the application is on the List of Tracked Applications, then information about the number of observed packets ("in_pkts") and bytes ("in_bytes") in the flow and contained in Record 520 is summated with respective information in the Per Application Aggregate Data List 524, and Record 520 may then be forwarded for further processing 526.

Further referring to FIG. 9f, an exemplary time-based policy 527 may be invoked at regular intervals, e.g., every 60 seconds. This policy reads entries 528 in the Per Application Aggregate Data List 524, and for any or each entry, may create a custom informational Flow Record "Aggregated Application Data" 530 and Reset the entry 532. Created custom informational Flow Record "Aggregated Application Data" 530 may then be forwarded for further processing 531.

It should be appreciated that if a NetFlow Exporter is equipped with a Network Based Application Recognition (NBAR) mechanism, the above policy could be augmented to utilize the application classification information ("application_tag") reported in a customized "Protocol Port" Flow Record, thus achieving a higher granularity of applications bandwidth consumption.

Additional exemplary policies that can be supported by an embodiment of the present invention include:

Network Traffic Per Application Protocol Per Link Monitoring

An embodiment of this policy module inputs NetFlow messages which contain information about network device ingress and egress interfaces through which flow entered and exited the network device, and can produce flow classification information, bytes and packets counts observed in the flow and timing information related to the inception and termination of the flow. For each NetFlow exporter or selected combinations of NetFlow exporters, this policy module is able to sum up the number of packets and the number of bytes per application protocol and interface pairs.

A list of watched protocols may be included and the list may be configurable. All application protocols not included in the watch list may be summed up under a protocol designated as "other". An application protocol may be interpreted as an OSI Layer 3 protocol (e.g. TCP), an OSI Layer 4 destination port (e.g. port 80—http), as an OSI Layer 7 classifier (e.g. a classifier engine ID, such as PANA-L7, followed by a vendor-specific application ID within this classification) or any other network traffic classification schema.

A pair of network interfaces constitutes a link. The interfaces in a link may be identified by their respective SNMP indexes (input_snmp and output_snmp). The number of links may be determined at run time, limited to a certain subset of interfaces by configuration or hard coded. In general, there is no limitation on the number of observed links. The policy module may include a time-based trigger, which enables the reporting of aggregated results at configurable time periods, emit an aggregated report based on a certain counter, or report each interesting link traversal by traffic.

The information deliverable from the utilization of this policy module can be used by a network manager to view in real time details of network traffic, including but not limited to the number of bytes or packets, per:

A specific network device
A link of the network device
An application protocol

For a selected network device, the network manager can see the composition of network traffic by application protocol within each link, or by link within each application protocol. The network manager may also discern the events when traffic through a link becomes uncharacteristically heavy or when a packet size on a certain link drastically decreases. The latter event may signify a hardware malfunction or be a sign of a cyber attack.

The data generated by this policy module can be used without limitation for network-wide load balancing, e.g., by moving network traffic from more heavily used parts of the network to less used parts of the network, content-based routing derived from the application identification information, and other similar purposes. Yet another use of this data is in general traffic study and capacity planning of the network.

Identifying Top Host Connections Per Protocol

An embodiment of this policy module inputs NetFlow messages which contain information about the source and destination IP addresses of the connecting hosts and produces a list of most active hosts over a time period by summing up the number of connections made by each observed host. The list of active hosts may include all hosts observed over a certain period, a group of N most active hosts ("Top N Connections"), or a group of hosts selected according to some other criteria.

The policy may include a time-based trigger, which enables the reporting of aggregated results at configurable time periods or emit an aggregated report based on a certain counter or other criteria.

The information deliverable from the utilization of this policy module can be used by a network manager to identify hosts that are initiating the most connections over a specified period of time. This information can be an indication of an infected host spreading a virus or a worm or email spam.

Identifying Top Host Talkers

An embodiment of this policy module inputs NetFlow messages which contain information about the source and destination IP addresses of communicating network hosts and sums up the number of bytes and the number of packets sent by each observed host to produce a list of most active hosts over a predefined time period.

A list of watched protocols may be included and the list may be configurable. All application protocols not included in the watch list may be summed up under a protocol designated as "other". An application protocol may be interpreted as an OSI Layer 3 protocol (e.g., TCP), an OSI Layer 4 destination port (e.g., port 80—http), as an OSI Layer 7 classifier (e.g., a classifier engine ID, such as PANA-L7, followed by a vendor-specific application ID within this classification) or any other network traffic classification schema.

The list of active hosts may include all hosts observed over a certain period, a group of N most active hosts ("Top N talkers"), or a group of hosts selected according to some other criteria.

The policy may include a time-based trigger, which enables the reporting of aggregated results at configurable time periods or emit an aggregated report based on a certain counter or some other criteria. The policy module can generate multiple message types, such as one for the overall highest traffic producers, and another for the hosts which generated the most packets.

The information deliverable from the utilization of this policy module can be used by a network manager to analyze network traffic for the patterns indicating DoS or Low Intensity DoScyber attacks and for an overall load balancing, traffic study, and capacity planning.

An additional benefit of this rule is that even though reporting of Top Host Talkers can be configured on some network devices, configuring this in NF2SL effectively configures it on all network devices connected to NF2SL at once.

Monitoring Edge Device Access Control Violations

An embodiment of this policy module inputs NetFlow and its derivatives, such as Cisco ASA NetFlow Security Events Language (NSEL), messages which contain information about events on the network edge device. In an exemplary embodiment, NF2SL inputs Cisco ASA NSEL messages and processes information in the fields related to the security events, such as the NSEL NF_F_FW_EVENT field. By assessing the value reported in such fields, NF2SL is capable of pinpointing all or selected network policies offenders and produce a list of hosts (Top N) with most violations over a period of time. The policy may include a time-based trigger, which enables the reporting of aggregated results at configurable time periods or emit a report based on a certain counter or some other criteria. If the monitored edge device is integrated with an AAA system (e.g. Microsoft Active Directory, RADIUS, etc.) the report may contain the user id of a network policy violator. The report may include information about the exact violated policy (i.e., identifies a breached ACL) if the edge device is capable of producing such information.

The information deliverable from the utilization of this policy module can be used by a network manager to identify hosts showing erratic behavior and identify the users engaged in inappropriate activities. This could be an indicator of a bad actor or an infected host. Furthermore, by correlating information about violated network policies with the actual edge device configuration information, the network manager may find out which resource was of interest to the offender and, if required, adjust the organization's security posture.

Monitoring DNS Servers Behavior

An embodiment of this policy module inputs NetFlow messages which contain information about the network traffic between the hosts and DNS servers and is able to calculate an average DNS servers' response time and an average size of the exchanged packets over a time interval. The policy is able to report average response time and average packet size for a list of selected servers or for all observed DNS servers. The policy may include a time-based trigger, which enables the reporting of aggregated results at configurable time periods or emit a report based on a certain counter or some other criteria.

This policy module may be extended to an arbitrary network service characterized by a well known OSI Layer 4 port number (e.g., an http server on port 80) or by an OSI Layer 7 classifier (e.g., PANA-L7 accompanied by an application identifier)

The information deliverable from the utilization of this policy can be used by a network manager to identify problems related to the DNS service when the DNS response time increases. Since the DNS service enables delivery of the content to the end users, it must provide the highest level of availability and shortest response times across widely distributed networks. Because of the important role of DNS to business operations, security attacks often target DNS servers, flooding them with traffic in hopes they reach a point of failure in order to disrupt the service. A slowdown in a DNS service response time may indicate a disruptive attack in progress. Then network manager may take protective measures and to reroute his local hosts DNS requests to other DNS servers.

Furthermore, by studying the average packet size exchanged by the DNS servers and the DNS service requestors, the network manager may identify if the DNS service was subverted. For example, an increase in the DNS service response packet size may indicate a subverted DNS server attempting to stage a buffer overflow attack targeted at the DNS service requestors.

It is also appreciated that by studying next hop information provided by a DNS service reflected in the subsequent host communications and noting a drastic change in the routing paths suggested by the DNS service, this policy may identify a malicious activity such as the DNS Changer malware.

Monitoring Average Packet Size Per Link

An embodiment of this policy module inputs NetFlow messages which contain information about network traffic and is able to calculate average size of the network packets which passed through a pair of network device interfaces ("link") over a time interval. The policy may include a time-based trigger, which enables the reporting of aggregated results at configurable time periods or emit a report based on a certain counter or some other criteria.

The information deliverable from the utilization of this policy can be used by a network manager to pinpoint network bottlenecks or a malicious activity. An unexpected drop in packet size (packet fragmentation) could be an indication of malfunctioning hardware or an ongoing cyber attack. Furthermore, by correlating this information with information obtained from the servers on the network, the network manager may identify if information delivery problems originate on the network or are due to a poor server performance: a healthy network definitely identifies the server as a problematic actor. In the latter case the network administrator may identify a poorly performing application and undertake corrective measures.

Monitoring Average Packet Size Per Application Protocol Per Link

An embodiment of this policy module inputs NetFlow messages which contain information about network traffic and is able to calculate the average size of network packets which passed through a pair of network device interfaces ("link") over a time interval for each of the watched application protocols. The policy is able to report average packet size per watched protocols. The policy may include a time-based trigger, which enables the reporting of aggregated results at configurable time periods or emit a report based on a certain counter or some other criteria.

The information deliverable from the utilization of this policy can be used by a network manager to pinpoint network bottlenecks or a malicious activity. An unexpected drop in packet size (packet fragmentation) could be an indication of a malfunctioning hardware or an ongoing cyber attack. Furthermore, by correlating this information with information obtained from the servers, the network manager may identify if information delivery problems originate on the network or are due to a poor application server performance: a healthy network definitely identifies the application server as a problematic actor. In the latter case the network administrator may identify a poorly performing application and undertake corrective measures.

Identifying Edge Device Top Bandwidth Users

An embodiment of this policy module inputs NetFlow and its derivatives, such as Cisco ASA NetFlow Security Events Language (NSEL), messages which contain information about traffic passing through the edge device. By summing up the observed communications, this policy is able to identify the top N consumers of the edge device bandwidth over a time interval. The information about the consumers may be provided as the IP addresses of the communicating network hosts. If the edge device is integrated with an AAA system (e.g. Microsoft Active Directory, RADIUS, etc.) the report may attribute consumed bandwidth to a particular user id. The policy may include a time-based trigger, which enables the reporting of aggregated results at configurable time periods or emit a report based on a certain counter or some other criteria.

The information deliverable from the utilization of this policy module can be used by a network manager to identify highest bandwidth users of the network going through the edge devices. This information can be used to identify unwanted network usage by employees (for example streaming video, excessive internet browsing, etc.) or the transfer of large file from inside the network to unauthorized outside locations.

Furthermore, due to the high traffic volume and flow rates in typical edge device deployment, information about device bandwidth consumption is generally not collected. This deficiency is due to a heavy load on the edge device when generating syslogs and the inability of log collection and STEM systems to accept and use such a high volume of the incoming logs.

Due to its high performance and data aggregation capabilities, NF2SL enables network administrators to include edge device bandwidth consumption information in the overall network management data pool and derive valuable insights into the network capacity and security posture.

Identifying Edge Device Top Bandwidth Users by Network Device by Application Protocol An embodiment of this policy module inputs NetFlow (and its derivatives, such as NetFlow v9, IPFIX, Cisco ASA NetFlow Security Events Language (NSEL), Palo Alto Networks NetFlow), messages which contain information about traffic passing through the edge device and applications causing the generation of such messages, to the extent that such applications are characterized by a well known OSI Layer 4 port number (e.g. an http server on port 80) or by an OSI Layer 7 classifier (e.g. PANA-L7 accompanied by an application identifier). By summing up the observed communications, this policy is able to identify the top N consumers of the edge device bandwidth for a particular application over a time interval. The information about the consumers may be provided as the IP addresses of the communicating network hosts. If the edge device is integrated with an AAA system (e.g. Microsoft Active Directory, RADIUS, etc.) the report may attribute consumed bandwidth to a particular user id. The policy may include a time-based trigger, which enables the reporting of aggregated results at configurable time periods or emit a report based on a certain counter or some other criteria.

The information deliverable from the utilization of this policy module can be used by a network manager to identify highest bandwidth users of the network going through the edge devices and identify the top bandwidth consuming applications. This information can be used to identify unwanted applications usage by the employees (for example, use of unsanctioned applications) and presence of malware applications, such as botnet slaves, on the internal hosts.

Furthermore, due to a high traffic volume and flow rates in typical edge device deployment information about device bandwidth consumption is generally not collected. This deficiency is due to a heavy load on the edge device when generating syslogs and the inability of the collection and STEM systems to accept and analyze such a high volume of the incoming logs.

Due to its high performance and data aggregation capabilities, NF2SL enables network administrators to include edge device bandwidth consumption information on the per-application basis in the overall network management data pool and derive valuable insights into the network capacity and security posture.

Network Subnets Monitoring

An embodiment of this policy module inputs NetFlow messages which contain information about destination IP addresses of the communicating network hosts and is able to sum up the number of bytes and the number of packets sent by each observed host to a list of monitored external subnets. This policy module is able to produce a list of the subnets with most traffic over a predefined time period. A list of watched protocols may be included and the list may be configurable. All application protocols not included in the protocols watch list may be summed up under a protocol designated as "other". It is appreciated that an application protocol may be interpreted as an OSI Layer 3 protocol (e.g. TCP), an OSI Layer 4 destination port (e.g. port 80—http), as an OSI Layer 7 classifier (e.g. a classifier engine ID, such as PANA-L7, followed by a vendor-specific application ID within this classification) or any other network traffic classification schema.

The list of subnets may include all monitored subnets, a group of N most accessed subnets, or a group of subnets selected according to some other criteria.

The policy may include a time-based trigger, which enables the reporting of aggregated results at configurable time periods or emit an aggregated report based on a certain counter or some other criteria. The policy module can generate multiple message types, such as one for the overall highest traffic receivers, and another for the subnets which received the most packets.

The information deliverable from the utilization of this policy module can be used by a network manager to analyze network traffic between the internal hosts and remote subnets such as those dedicated to the cloud-based resources, determine traffic volume and traffic patterns to each remote subnet and operate remote resources in an optimal fashion.

Behavior-Based Network Monitor

An embodiment of this policy module implements an "over Baseline" policy by engaging at least two modes of operation: learning and monitoring. The learning mode can be turned on for gathering baseline network traffic information. The monitoring mode uses information obtained during the learning period of operation to monitor the network conditions. These two operation modes are not exclusive: the learning process may continue while monitoring is turned on.

With the learning mode in operation, the policy is able to gather baseline information and store it, e.g., in a persistent storage such as a local database (e.g., one that is provided as a part of NF2SL). Baseline information may be a consolidation of traffic behavior over short time intervals, e.g., 5 minutes. Due to the pervasiveness of the learned behavioral information, a Baseline policy is able to take into account the traffic patterns depending on the time of the day, the day of the week and even months. Besides time-based traffic patterns, the following traffic patterns are included in the Baseline behavior:

number of concurrent flows
        global packets rate
        global throughput
    per protocol throughput
        new flows creation rate
        number of TCP/IP SYN packets sent and received
        number of TCP/IP connection resets
        average flow duration
        flow duration dispersion
        remote subnets utilization
    VLAN utilization
    global applications composition
    etc.

It is appreciated that the above list of traffic patterns is not all inclusive and other traffic characteristics may be included in the baseline behavior computation.

Once baseline information is collected, it could be exported to a tool such as a spreadsheet for analysis and definition of thresholds. Alternatively, a Baseline policy can implement a built-in mechanism for determining deviations from normal traffic patterns.

A 3-tier approach to setting thresholds may be utilized if desirable: Prediction, Warning, and Breaking Point. It is appreciated that thresholds may be determined manually, derived from a statistical analysis, or fitted into a fuzzy behavioral model.

Thresholds are preferably set before the monitoring mode of policy operation is turned on. When the monitoring mode is turned on, the policy is able to compare currently observed behavior with the baseline information using the corresponding threshold model. When the threshold is exceeded, an alert message, e.g., a syslog message or an email, may be generated and sent directly to a network manager or to a SIEM system for alerting network monitoring analysts.

The baseline policy may behave in an adaptive manner by adjusting the baseline network behavior based on further observations or triggered by an external event such as a network manager command.

The information deliverable from the utilization of this policy can be used by a network manager to detect abnormal network activity caused by a host infected with malicious software, or caused by a bad actor, in a timely manner.

Botnet Activity Detection

Botnet slaves are notoriously hard to detect by traditional host-based and network-based means. Oftentimes botnet slaves avoid detection by host-based mechanisms by installing themselves as root-kits undetectable from within the host. Traditional network-based detection of the botnet slaves relies on collecting enormous amounts of information and extensive forensic investigation looking for botnet slaves' beacons. These problems may be overcome by employing a system which processes network information in a streaming fashion.

An embodiment of a botnet activity detection policy module is able to identify an event when an "off-limit" device on an internal network responds to an outside peer. Hosts on an internal network generally may initiate connections to the outside world (e.g., web browsing), but if a connection is initiated from the outside, response to this traffic is a possible indication of the existence of a botnet slave on an internal network.

An embodiment of this policy module inputs NetFlow messages which contain information about destination IP addresses of the communicating network hosts and compares these IP addresses with a configured list of monitored off-limit network devices. If the IP address is not on the list, no action is taken. If the destination IP address is found in the list of monitored devices, the source IP address and destination OSI Layer 4 port, as well as the destination IP address and the source OSI Layer 4 port, are stored in a list of potential alerts along with other information, such as bytes and packets counts, etc. Application protocol information may also be noted in the list of potential alerts. In this context, protocol information may be interpreted as an OSI Layer 3 protocol (e.g., TCP), an OSI Layer 4 destination port (e.g., port 80—http), as an OSI Layer 7 classifier (e.g., a classifier engine ID, such as PANA-L7, followed by a vendor-specific application ID within this classification) or any other network traffic classification schema.

In the next step, the policy module monitors if there was a response to the connection initiator from the monitored off-limits internal device. If such communication takes place within a preconfigured period, the policy module alerts the network manager or a STEM system by sending a corresponding message using one of the standard communication protocols such as syslog, email, etc. If the preconfigured response time period has elapsed, the policy can remove the off-limits device from the list of potential alerts.

The time interval during which a device is included into a list of potential alerts may vary. This step allows catching botnet communications aware of the botnet monitoring system and trying to avoid detection by delaying a response.

Another embodiment of a botnet detection policy module inputs NetFlow messages which contain information about IP addresses of the internal network hosts, their communication peers and protocols utilized during these communications. In this context, protocol information may be interpreted as an OSI Layer 3 protocol (e.g. TCP), an OSI Layer 4 destination port (e.g., port 80—http), as an OSI Layer 7 classifier (e.g., a classifier engine ID, such as PANA-L7, followed by a vendor-specific application ID within this classification) or any other network traffic classification schema.

Thus the policy module gradually compiles a database of all observed communications, which can be analyzed with the purpose of discovering unusual communications. This analysis could be performed using a data streaming clustering method such as STREAM, BIRCH, etc., to determine in a streaming fashion large network traffic patterns groups and identifying the outliers. Presence of small "out-of-normal" clusters is a definite indication of an abnormal network activity which is characteristic of botnet communications. If such abnormal clusters are discovered, the policy module can alert the network manager or a SIEM system by sending a corresponding message using one of the standard communication protocols such as syslog, email, etc.

It is appreciated that discovery of unusual communications in a database of all observed communications may be performed by other typological data analysis methods or in a static fashion by taking the clustering computation off-line.

The information deliverable from the utilization of this policy can be used by a network manager to identify and eradicate botnet slaves on the network in a timely and cost-effective fashion which is impossible using current methods which attempt to discover network devices infection by collecting oversized databases of mostly irrelevant data and analyzing them post-factum off-line. The usefulness of timely discovery of the network-borne malware by the techniques disclosed herein is made clear by rules recently promulgated by the US Federal Communications Committee (FCC).

Conversations

An embodiment of this policy is able to consolidate conversations between devices over a time period T and send N top conversations to a SIEM system. A conversation is defined as a series of NetFlow messages generated as a result of interactions between two hosts (Source IP and Destination IP), using the same ports (Source port and Destination Port), over the same transport (TCP or UDP), and going through the same router/switch (exporter). The number of bytes and packets of these flows can be summed up over a defined period of time, and pushed out in a consolidated syslog or other format message. This technique can be used as one method of dramatically reducing the volume of machine data that is sent to be collected and/or analyzed by a downstream STEM system.

Reputation Based Alerts

An embodiment of this policy is capable of detecting network traffic flowing from or to network devices deemed to be unsafe for communication. The criteria of classifying a network device as unsafe may be based on a publicly available or private database of such network devices identified by either their IP addresses or Fully Qualified Distinguished Names (FQDNs). For example, AlienVault provides a publicly available database of the network devices which are known to engage in phishing attacks, spread of malware, botnet masters, etc. The devices are ranked according to the presumed level of their badness, called reputation. For example, a danger of communicating with a known botnet master is ranked higher that a connection to a phishing host.

The policy according to this embodiment is able to receive a list of such unsafe IP addresses or FQDNs from an external device or directly queries a provider of such a list and reports the occurrences of communications between the network devices on the protected network with the network devices on the unsafe devices list. In a timely manner the policy is able to issue an alert indicating the act of communication and a reputation level of the contacted external network device.

Traffic From Certain Countries

Certain countries are known to be engaged in the acts of industrial espionage and cyber warfare. An embodiment of this policy tracks communications from the network devices residing in such countries to the internal network devices and from the internal network devices to the hosts in such countries. A per country list of IP address ranges is publicly available from the Internet Assigned Numbers Authority (IANA). The policy uses such a list or a subset of such a list to determine a country from which the external network device is communicating and in a timely manner reports the acts of such communications.

OSI Layer 3 Protocols

Network utilization monitoring is of high importance to enterprises and telecommunication providers. A great majority of the application data in such environments is transmitted over the UDP (OSI Layer 3 protocol id 17) and TCP/IP (OSI Layer 3 protocol id 6). Besides these "workhorse" protocols, there is a great volume of communications related to network maintenance. For example, the ICMP (Internet Control Messaging Protocol) protocol (OSI Layer 3 protocol 1) includes messages to verify network device's status, trace network routes, etc. Network packets associated with the ICMP and other similar utility protocols like IS-IS, EGP, RSVP and others constitute a substantial share of the overall network traffic. Due to the presence of substantial control traffic on the network, telecommunication providers require constant monitoring of such traffic.

An embodiment of this policy collects information about control traffic being forwarded via OSI L3 protocols other than TCP and UDP. The policy may keep track of all OSI Layer 3 protocols or use a configured list of the OSI Layer 3 protocols that should be watched. For some protocols, such as ICMP, the policy may be configured to track only certain specific subtypes of the transmitted data. For example, tracking Redirect ICMP packets issued by unsanctioned network devices may provide a clear indication of subversive activity on the network.

Yet another embodiment of the policy is configured to watch for restricted communications. For example, the GRE protocol is designed to carry any non-IP traffic over an IP network. This GRE capability may be used to mask illegal traffic which, if not GRE encapsulated, would be detected by the network security infrastructure. The policy watches for GRE encapsulated network flows, checks if the source IP address of said flow is on the list of legitimate GRE traffic sources and in a timely manner reports communications attempted by network devices not included in the legitimate sources list.

It is appreciated that both embodiments of the above policy could be implemented in a single policy module or in a plurality of policy modules.

Aggregated (Consolidated) Traffic

An embodiment of this policy uses a list of destination network subnets and network subnet masks and sums up the number of bytes sent by the local network devices to such subnets and the number of bytes sent by such subnets to the local hosts. This policy is able to provide network managers with valuable insight into utilization of remote resources such as cloud-based private data centers.

It is appreciated that with traffic volume increase, measuring network bandwidth utilization in the manner described here is no longer possible using traditional means such as NetFlow collectors. The problem stems from the extremely high rate of NetFlow traffic emitted by the modern network devices. For example, an 80 Gbps mid-range router such as Cisco ASR1000 is capable of processing and reporting up to 400,000 flows per second. Even a very high end NetFlow collector which saves received NetFlow records for subsequent processing is not capable of processing messages at such rates and rarely reaches the 100,000 records per second barrier. Such high rates could be sustained only when NetFlow processing is done in the streaming fashion.

Yet another embodiment of this policy provides an insight into the internal network utilization. In this embodiment, the policy aggregates network traffic information per VLAN rather than a subnet IP address and the IP address mask.

Real Time Interface Utilization

Network performance and reliability are critical components in today's enterprises and service provider organizations. It is important to make sure that all network components perform appropriately and detect problems in the shortest time possible.

An embodiment of this policy summarizes traffic passing through a network device interface and notifies when interface capacity is underutilized or interface utilization level becomes too high, which may lead to dropped network packets and overall congestion. The interface may be identified by its SNMP index. The interface type and capacity is deduced from the NetFlow Options FlowSets emitted by the network device. Interface utilization thresholds could be specified manually, derived from a statistical analysis, or fitted into a fuzzy behavioral model.

It is appreciated that this policy may track utilization of a single interface or a plurality of interfaces.

NetFlow Deduplication

NetFlow deduplication is a technique to eliminate "duplicate" NetFlow records. To gain complete visibility into network conditions, many organizations enable NetFlow on all network devices. As network packets travel from one host to another, they pass through multiple routers and switches, each of which will generate a NetFlow record representing the same network flow. Including information about duplicate flows may result in incorrect traffic volume calculations, or misrepresent the significance of a security event. In addition, significantly increased storage and software licensing costs can result.

An embodiment of this policy is able to implement flows deduplication based on dynamic selection of an authoritative exporter for each Source IP-destination IP host pair.

In an exemplary embodiment, this policy builds and maintains in memory a 4-dimensional matrix of source IP addresses, destination IP addresses, NetFlow exporters visible on the network, and time when an exporter last reported a communication between a pair of communicating endpoints identified by their IP addresses. Upon receiving a flow description, such as a NetFlow record, the policy updates the count of flows observed by that exporter between the end points found in the received flow description. The exporter with the current maximal number of observed flows ("weight") is designated as an authoritative exporter and only its flow reports are accounted for in the total tally.

If two or more exporters have same weight in the dynamic flow matrix, the ambiguity can be resolved, e.g., by comparing relative time when each exporter reported the same flow. The exporter which reported the flow at an earlier time is designated as the authoritative exporter since it is situated upstream from the other exporter for the given communication endpoints. The policy is able to compute exporters' relative time, e.g., by normalizing local time reported by each exporter to its own time ("clock skew") and computing relative time of the flow observation based on such clock skew. The routing path may be disambiguated further, e.g., by studying the next hop IP address reported in the flow description records. Alternatively, the Time-To-Live (TTL) value generally reported in the flow description indicates a sequence of flow traversal among the reporting exporters and may be used for these purposes.

At any given time this method is also able to provide a snapshot of the current routing topology of the network. This network topology could be reported to an entity capable of presenting this information to the end user graphically, in the form of textual tables, a two dimensional map, or by other means.

This embodiment of a policy can provide significant value to network managers by dynamically providing the exact counts of network bandwidth consumption. Timely delivery of this information is possible only when reported in a streaming fashion rather than post-factum, such as is done by traditional means such as retrieval from a flow collector database. Furthermore, deduplication of flow information in a streaming fashion significantly reduces the need for storage required by traditional flow collectors which may be used to deduplicate flow information after it was saved in a flow collector database.

NF2SL Converters

Figure 9X:
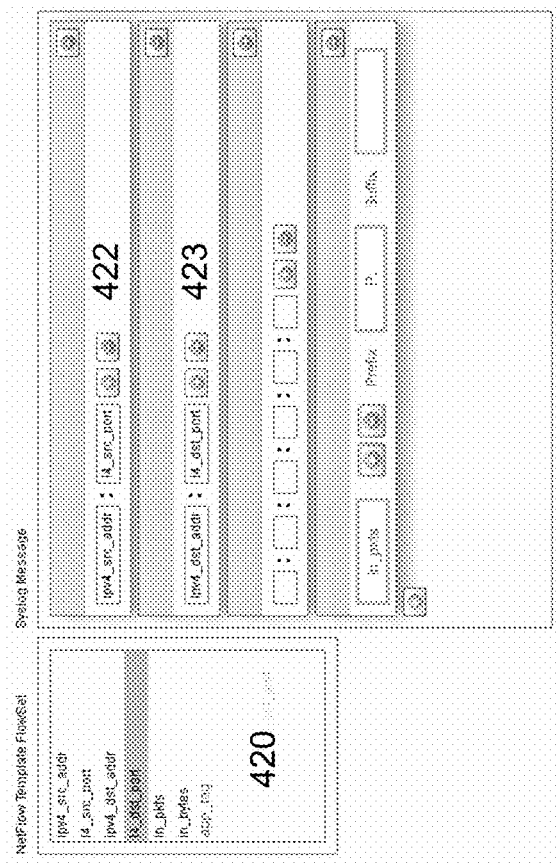
FIG. 9x provides a simplified block diagram and flow chart illustrating another policy that can be implemented in accordance with an embodiment of the present invention.

The NF2SL converter generally takes a NetFlow Data FlowSet record and produces a syslog message according to a mapping specified by a NF2SL administrator. FIG. 9X illustrates mapping of an exemplary NetFlow Template FlowSet 420 to Syslog Message 421 with the help of the NF2SL GUI-based Conversion Tool 431.

The NF2SL administrator can format a syslog message from a NetFlow Template by dragging field descriptors in the NetFlow Template FlowSet 420 and dropping them on the Conversion Tool 431 canvas. For example, the ipv4_src_addr and l4_src_port fields 422 and ipv4_dst_addr and l4_dst_port fields 423 are placed on the Conversion Tool 431 canvas. In the same fashion, the NF2SL administrator is able to map the in_pkts field 424.

An exemplary resulting Syslog Message 421 consists of the NetFlow producer timestamp 425, the NetFlow producer IP address 426, the NetFlow producer NetFlow Source ID 427, flow source IP address and source port 428, flow destination IP address and destination port 429, and the number of packets observed in the flow 430.

Generalizing the Streaming System Capabilities

The NF2SL system is an exemplary embodiment of this invention. It is appreciated that the concept of this disclosed streaming system, which is capable of receiving network metadata in a plurality of formats; processing and optionally transforming such received network metadata according to a policy or a plurality of policies; converting such processed network metadata into a plurality of formats; and relaying in real time converted network metadata, could be extended to other practical applications.

Figure 10:
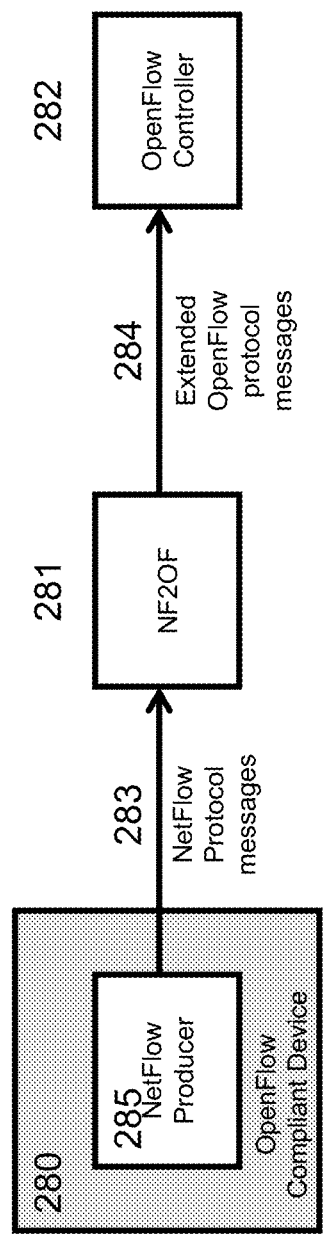
FIG. 10 provides a simplified block diagram and flow chart illustrating conversion and analysis of NetFlow metadata to OpenFlow in accordance with an embodiment of the present invention.

For example, and referring to FIG. 10, the streaming system may be used for enhancing the ability of an OpenFlow Controller 282 to manage traffic flowing through a NetFlow producing OpenFlow Compliant Device 280 such as a switch or a router.

A NetFlow Producer 285 on an OpenFlow Compliant Device 280 may be configured to emit NetFlow Protocol messages 283 indicating not only the amount of traffic passing through a port or observed in a flow, but also information about which exact application instantiated the flow and other additional information. This enhanced information about the traffic volume and its origin may then be digested by the NetFlow-to-OpenFlow (NF2OF) embodiment of the streaming system 281 and passed on to an OpenFlow Controller 282 via extended OpenFlow protocol messages 284 such as Port Statistics, Flow Statistics and Individual Flow Statistics or their analogs.

This aspect of the present invention takes network management capabilities of an ordinary OpenFlow Controller to a higher level of sophistication by providing an insight into the application level Quality of Service (QoS) requirements.

Due to regulatory compliance requirements such as the Payment Card Industry Data Security Standard (PCI-DSS), the Federal Information Security Management Act of 2002 (FISMA), the Sarbanes-Oxley Act (SOX), the Health Insurance Portability and Accountability Act (HIPAA), etc., organizations must continuously monitor and report on a broad range of security-related data, including events, system configurations, network traffic and performance. A major part of this requirement is collection and preservation of the logs. Log collection proves to be a hard task due to a loss-prone nature of the syslog protocol which uses UDP for transporting syslog messages.

Figure 11:
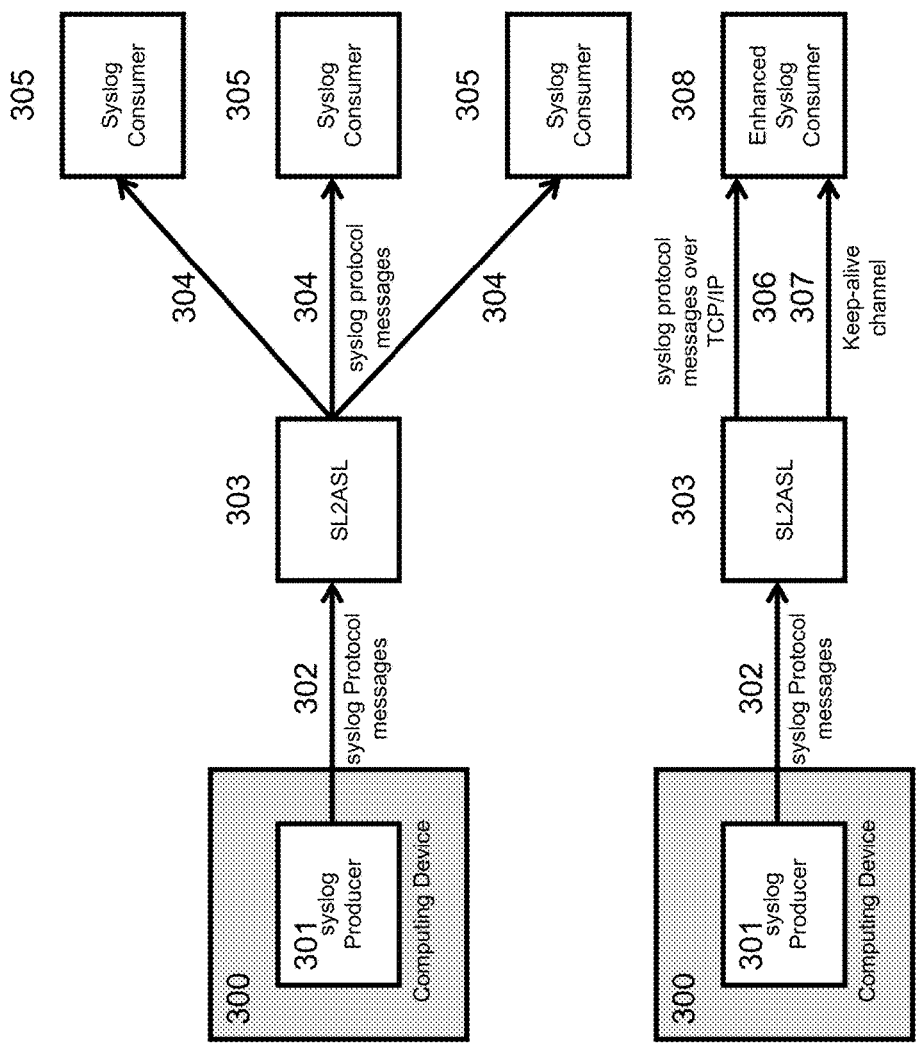
FIG. 11 provides a simplified block diagram and flow chart illustrating processing of Syslog metadata in accordance with an embodiment of the present invention.

Referring to FIG. 11, an embodiment of the present invention may be used for assured log delivery purposes. In this embodiment, the SL2ASL (syslog to Assured syslog) system 303 is deployed in a close proximity to the syslog Producer 301 which resides on a Computing Device 300. Deployment of the SA2ASL system in a close proximity to a network metadata producer minimizes the risk of loss of network metadata.

In this embodiment, the SL2ASL system 303 replicates received syslog Protocol messages 302 to a plurality of syslog Consumer devices 305 using a standard syslog protocol messages 304 delivery UDP transport. This technique increases the probability of complete log information preservation.

With further reference to FIG. 11, in yet another embodiment, the SL2ASL system 303 may communicate with an Enhanced Syslog Consumer device 308 by sending the received syslog Protocol messages 302 over a reliable TCP/IP connection 306. A Keep-alive channel 307 ensures that in case of failure of Enhanced Syslog Consumer 308, the SL2ASL system 303 uses local congestion control facilities to temporarily accumulate the syslog Protocol messages 302 while the Enhanced Syslog Consumer device 308 restarts.

This embodiment of the present invention significantly simplifies fulfilling log collection regulatory compliance requirements.

An embodiment of the present invention may be used for reliable delivery of NetFlow information from remote networks to a central network over WAN.

Figure 11A:
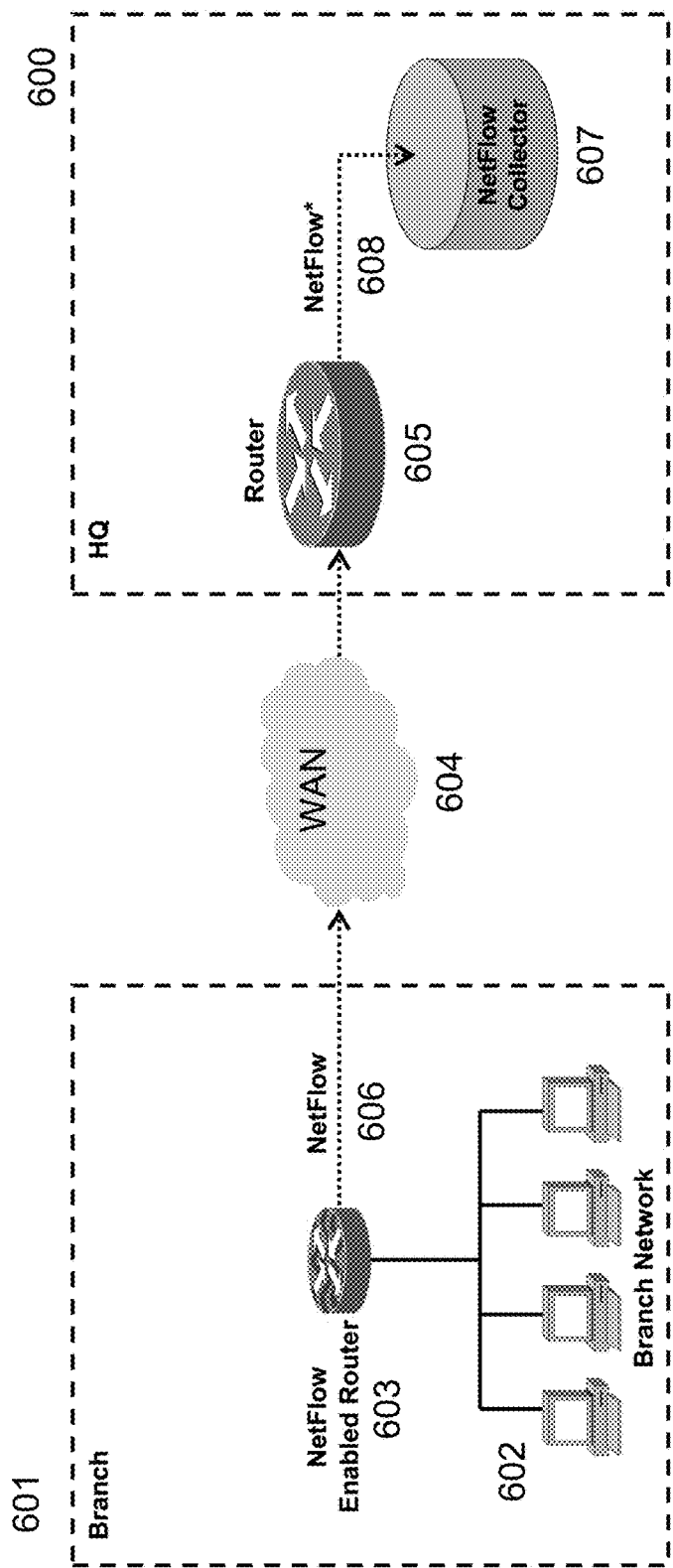
FIG. 11a provides a simplified block diagram illustrating processing of metadata in a branch subnet of a large network in accordance with an embodiment of the present invention.

Referring to FIG. 11a, in a typical Branch 601 deployment NetFlow Enabled Router 603 collects NetFlow information 606 on Branch Network 602 and transmits NetFlow information 606 over WAN 604 to a NetFlow Collector 607 through a Router 605 deployed at HQ 600.

However, due to the unreliable nature of the UDP protocol used to transport NetFlow information 606 between Branch 601 and HQ 600, a portion of the transmitted NetFlow information 606 may be lost in transit, resulting in incomplete NetFlow* information 608 reaching NetFlow Collector 607.

Use of a reliable or semi-reliable transport protocol such as SCTP is often undesirable due to a high rate of NetFlow events on NetFlow Enabled Router 603 which a reliable transport protocol cannot process. In such cases, network administrators are forced to resort to sampled NetFlow reporting, thus further increasing sparseness of the network metadata.

Figure 11B:
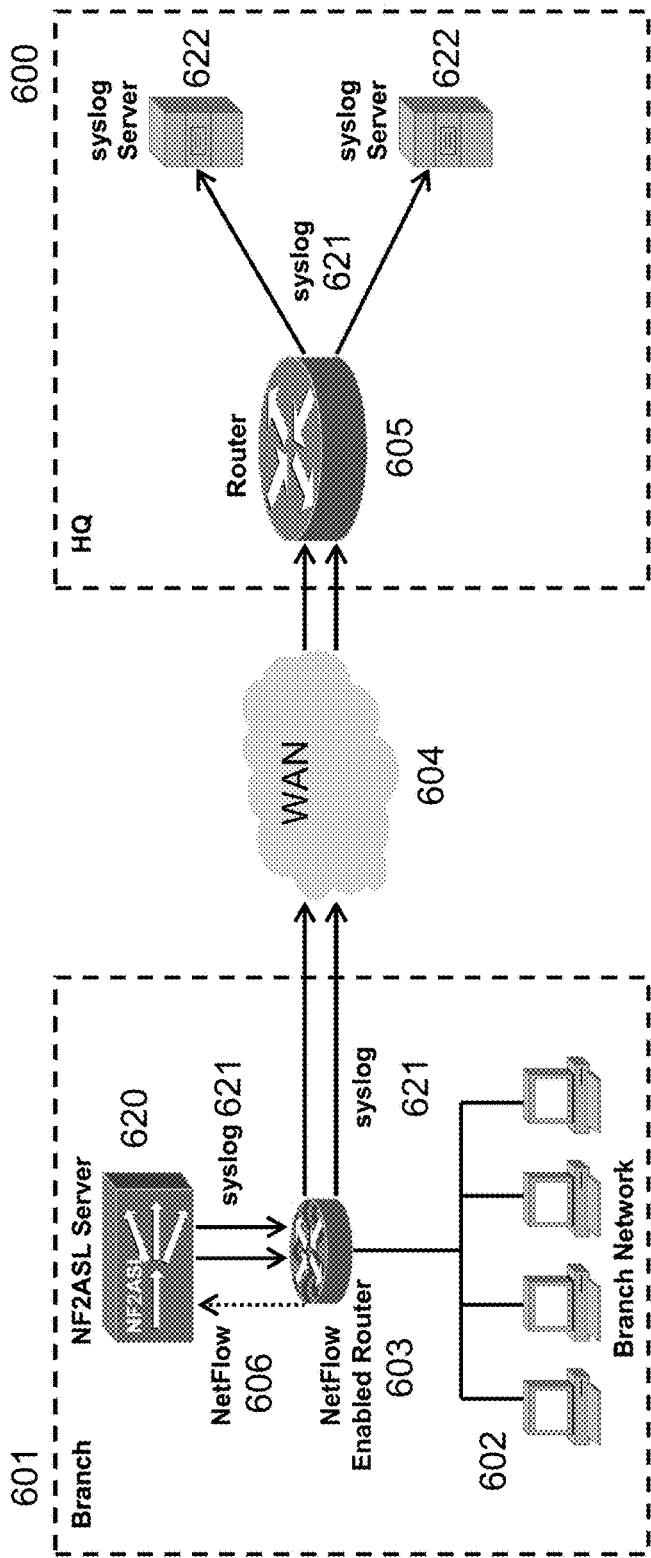
FIG. 11b provides a simplified block diagram illustrating processing of metadata in a branch subnet of a large network in accordance with an embodiment of the present invention.

Referring to FIG. 11b, an embodiment of the present invention, referred hereto as NF2ASL (NetFlow to Assured SysLog), prevents NetFlow information 606 losses in transit while supporting a high rate of NetFlow information 606 transmissions.

Further referring to FIG. 11b, NetFlow Enabled Router 603 collects NetFlow information 606 on Branch Network 602 and transmits NetFlow information 606 to NF2ASL server 620. Because NetFlow Enabled Router 603 and NF2ASL Server 620 are deployed in a close proximity to each other, NetFlow information 606 losses are either non-existent or negligible. Upon receiving NetFlow information 606, NF2ASL Server 620 converts NetFlow information 606 into syslog information 621. The conversion process may be performed according to one or a plurality of policies and conversion rules deployed on the NF2ASL Server 620 or according to a default conversion rule.

In order to maximize reliability of NetFlow information 606 delivery to HQ 600, NF2ASL Server 620 is configured to replicate syslog information 621 to a plurality of syslog Servers 622 deployed at HQ 600. Replicated syslog information 612 is delivered over WAN 604 to Router 605 deployed at HQ 600.

By replicating syslog information 621, NF2ASL Server 620 increases the probability of NetFlow information 606 preservation. It is anticipated that the probability of NetFlow information 606 preservation increases with the number of syslog Servers 620 to which syslog information 621 is replicated.

Figure 11C:
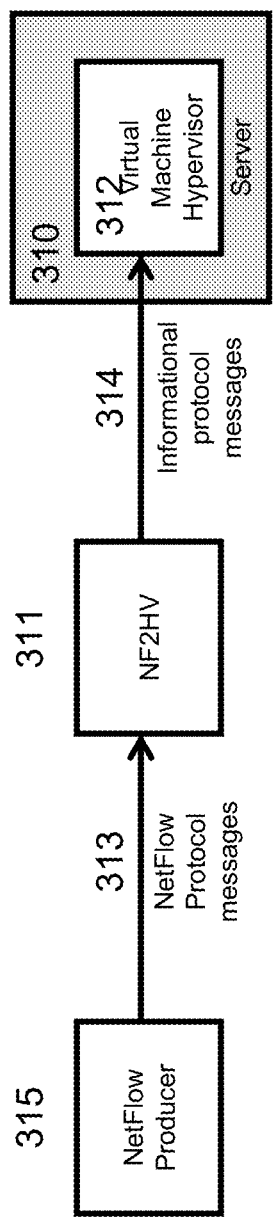
FIG. 11c provides a simplified block diagram illustrating processing of metadata in a network in a cloud based implementation in accordance with an embodiment of the present invention.

Referring to FIG. 11c, an embodiment of the present invention may be used for enhancing the ability of a Virtual Machine Hypervisor 312 to manage the composition of virtual machines under its control.

A NetFlow Producer 315 may be configured to emit NetFlow Protocol messages 313 indicating the amount of traffic destined to Server 310 which executes Virtual Machine Hypervisor 312 and to which application this traffic belongs. The information about the traffic volume and its semantic composition may be digested by the NetFlow-to-Hypervisor (NF2HV) embodiment of the streaming system 311 and passed on to Virtual Machine Hypervisor 312 executing on Server 310 in an informational protocol messages 314.

This aspect of the present invention enables Virtual Machine Hypervisor 312 to use real time network load and composition information for provisioning resources required by mission critical applications executing on Server 310.

Figure 12:
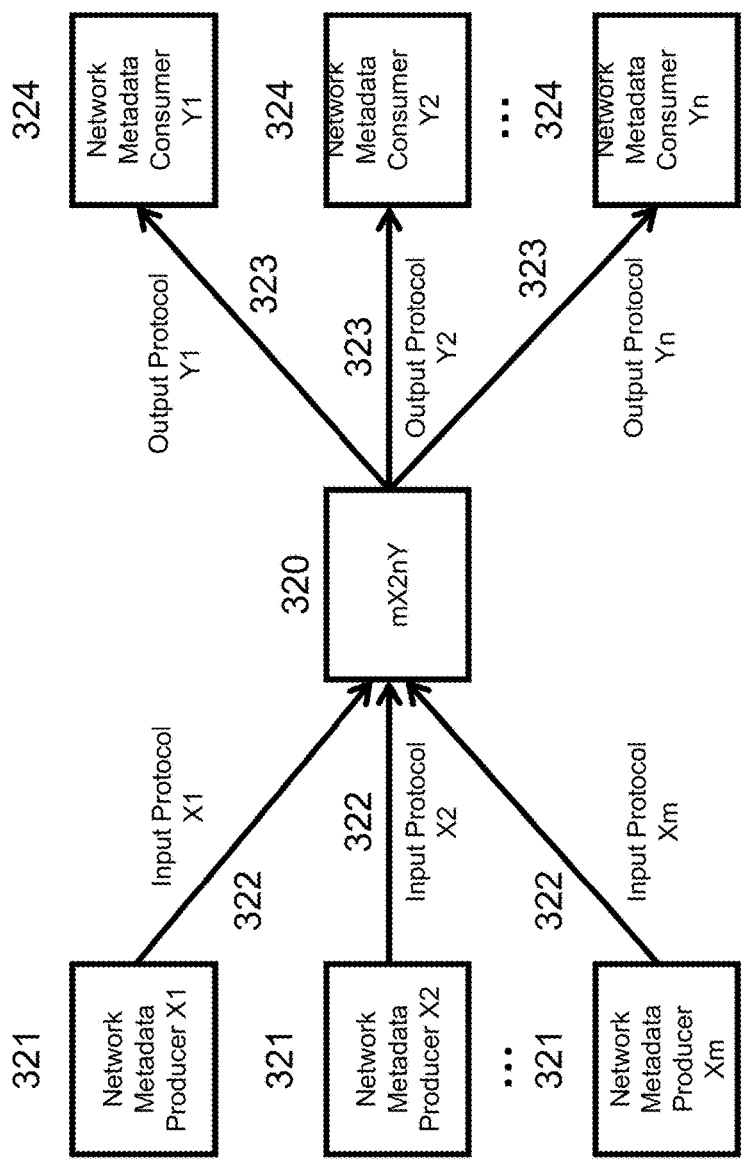
FIG. 12 provides a simplified block diagram illustrating routing of metadata in a network in accordance with an embodiment of the present invention.

Referring to FIG. 12, an embodiment of the present invention may be further generalized for use in the environments with m diverse Network Metadata Producers 321 and n diverse Network Metadata Consumers 324.

It should be appreciated that an mX2nY exemplary embodiment of the system 320 is capable of discerning a plurality of Input Protocols 322 used by the Network Metadata Producers 321 for transmitting network metadata. For instance, some of the Network Metadata Producers 321 emitNetFlow protocol messages while others communicate network metadata via the syslog.

Upon receiving a message containing network metadata in one of the acceptable formats 322, the mX2nY embodiment of the system 320 can dispatch the message internally to a policy or to a plurality of policies configured for that message's input format. The results of policy application may be forwarded to one or a plurality of the Network Metadata Consumers 324 over a plurality of Output Protocols 323.

Figure 13:
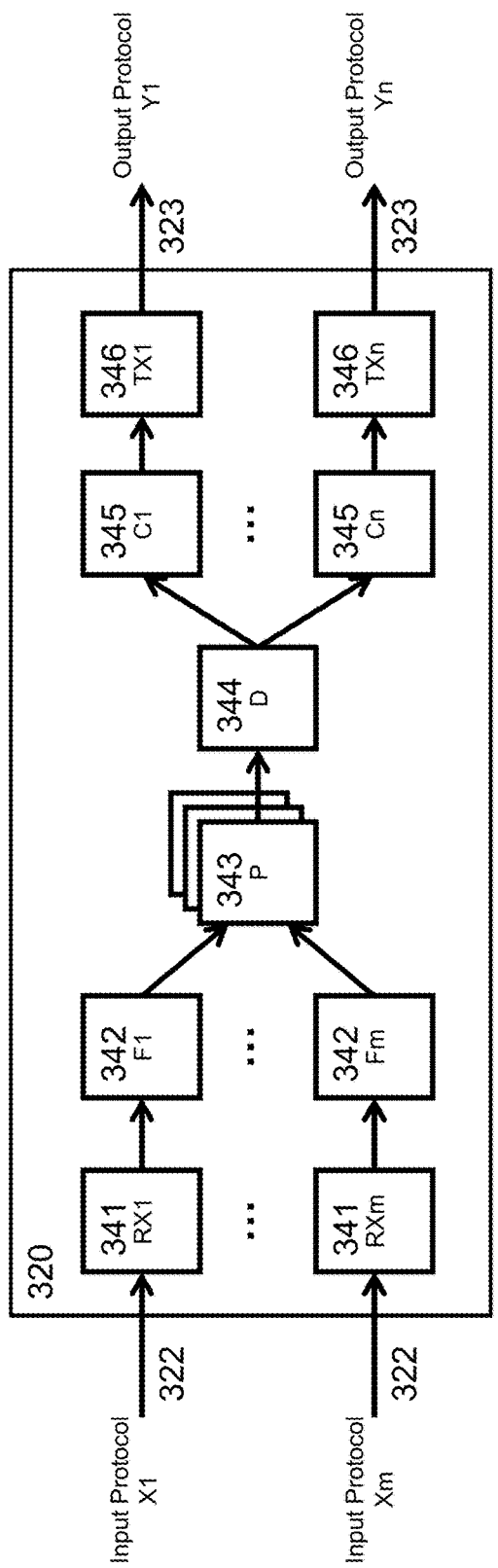
FIG. 13 provides a simplified block diagram illustrating analyzing and routing of generalized format metadata in a network in accordance with an embodiment of the present invention.

FIG. 13 illustrates an exemplary internal composition of an mX2nY embodiment of the system 320. In this example, Input Protocol messages of a certain type 322 are received by a dedicated Receiver module RX 341 which forwards the Input Protocol messages 322 to a dedicated Formatter module F 342. The Formatter module F 342 can transform the Input Protocol messages 322 into a common network metadata format understood by the Policy modules P 343. Then the Formatter module F 342 can pass transformed Input Protocol messages 322 to the Policy modules P 343 which upon applying the configured policies, can forward the Input Protocol messages 322 along with any derived network metadata to the Dispatcher module 344. The Dispatcher module 344 can be configured to distribute the Output Protocol messages 323 to the Converter modules 345, which can pass the Output Protocol messages 323 to the Transmission modules 346 for forwarding to the network metadata consumers.

It should be appreciated that the internal composition of an mX2nY embodiment of the system 320 may be different from the composition described above. For example, a plurality of Formatting modules 342 could be implemented as a single universal Formatting module, etc.

Further referring to FIG. 13, it should also be appreciated that an instance of the mX2nY embodiment of the system 320 may be deployed to receive network metadata 322 from another instance of the mX2nY embodiment of the system 320. In the same fashion, it should be appreciated that an instance of the mX2nY embodiment of the system 320 may be deployed to forward the results of the network metadata processing 323 to another instance of the mX2nY embodiment of the system 320.

While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention.

It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A method of processing network metadata generated on a network transmitting network traffic using one or more network protocols, the network including devices at least some of which receive network traffic through an ingress interface and transmit network traffic through an egress interface, the method comprising the steps of:
   receiving network metadata from a plurality of sources in a data processing system, in at least one data format;
   determining the type or character of said network metadata;
processing said network metadata by applying at least one policy governing network metadata processing, wherein said at least one policy includes the steps of:
   comparing the source of incoming network traffic to a predefined list of monitored off-limit devices on said network;
   if the destination IP address is on a predefined list of off-limit devices, storing the source IP/port, as well as the destination IP/port in a potential alert list, along with the number of bytes and packets reported in the ingress NetFlow record;
   examining output records to determine if the source IP/port and the destination IP/port match an entry in the potential alert list;
   if a match is found, treating such match as an indication that an internal host replied to an outside peer request; and
   generating an alert message in a timely manner to inform of a potential botnet infection; and
converting at least a portion of said network metadata into one or more different data formats that are used in said data processing system for other system metadata, in response, at least in part, to the results of said determining step.

2. The method as set forth in claim 1, wherein said processing step is performed while said network metadata is in transition on said network between a network device that generated said network metadata and a device that is able to store said network metadata.

3. The method as set forth in claim 2, wherein said at least one policy is applied for the purpose of detecting traffic on said network indicative of a potential security threat.

4. The method as set forth in claim 1, wherein said at least one policy includes the steps of:
   collecting information about internal network devices communicating with external network devices; said information comprising a list of communicating devices' IP addresses and protocols;
   applying a streaming cluster analysis method to determine patterns in communications between the communicating devices;
   identifying abnormal instances of communications between the communicating devices by the presence of small disjoint patterns in the set of all computed patterns;
   generating an alert message in a timely manner to inform of a potential botnet infection if at least one abnormal communication pattern is identified.

5. The method as set forth in claim 1, wherein said at least one policy is applied for the purpose of identifying traffic spikes on said network.

6. The method as set forth in claim 5, wherein said at least one policy includes the steps of:
   comparing the source of incoming network traffic to a predefined list of monitored devices on said network;
   if the source IP address is on a predefined list of devices, storing the source IP in an in-memory database along with the number of bytes and packets reported in the ingress NetFlow record;
   at predefined intervals examining the in-memory database and identifying devices which exceeded a threshold set forth by a network manager;
   generating an alert message in a timely manner to inform of a traffic spike.

7. The method as set forth in claim 1, wherein said at least one policy is applied for the purpose of improving the reliability of capturing NetFlow traffic on said network.

8. The method as set forth in claim 7, wherein said at least one policy includes the steps of:
   receiving one or a plurality of NetFlow messages over an unreliable network transport protocol;
   optionally converting said received NetFlow messages into one or a plurality of formats other than NetFlow, different flavor of NetFlow or same format as the received NetFlow;
   forwarding said received or converted messages to a plurality of end points over an unreliable network transport protocol, to at least one end point over a reliable network transport protocol, or to at least one end point over an unreliable network transport protocol and to at least one end point over a reliable network transport protocol.

9. The method as set forth in claim 1, wherein said at least one policy is applied for the purpose of reducing the number of NetFlow messages that arrives at the device that stores said network metadata on said network.

10. The method as set forth in claim 9, wherein said at least one policy includes the steps of:
    receiving a plurality of NetFlow messages;
    identifying similarities in said received NetFlow messages;
    consolidating information in the received NetFlow messages identified as similar into one or a plurality of NetFlow messages;
    discarding NetFlow messages for which information was consolidated; and
    forwarding consolidated NetFlow messages to the device that stores network metadata on said network.

11. The method as set forth in claim 10, wherein said step of forwarding consolidated NetFlow messages is performed after the passage of a configurable time period.

12. The method as set forth in claim 1, wherein said at least one policy is applied for the purpose of detecting when a network interface on said network becomes inoperable.

13. The method as set forth in claim 12, wherein said at least one policy includes the steps of:
- establishing a threshold time period during which the absence of an interface identifier in the incoming network metadata signifies said network interface's inoperable state,
- said established threshold time period being variable depending on the time and geographic criteria;
- monitoring network metadata related to said network interface;
- generating an alert message in a timely manner to inform of an inoperable state of said network interface if network metadata related to said network interface fails to be detected for a period in excess of said threshold time period.

14. The method as set forth in claim 1, wherein said at least one policy is applied for the purpose of measuring network latency using network metadata on said network.

15. The method as set forth in claim 14, wherein said at least one policy includes the steps of:
- establishing a threshold time period during which a network device which requested services of a Domain Name Server (DNS) must receive a response from said DNS service;
- monitoring network metadata describing communications between network devices and DNS services;
- computing time elapsed between said network device request for a DNS service and receiving a response from that DNS service;
- comparing said elapsed time with said threshold time period; and
- generating an alert message to inform of excessive network latency.

16. The method as set forth in claim 1, wherein said at least one policy is applied for the purpose of providing real time network visibility per application type across a plurality of devices on said network.

17. The method as set forth in claim 1, wherein said at least one policy is applied for the purpose of producing a list of most active hosts over a specified time period on said network.

18. The method as set forth in claim 17, wherein said at least one policy includes the steps of:
- receiving a plurality of network metadata messages;
- identifying network metadata related to individual network hosts;
- aggregating network metadata for each identified network host;
- selecting a configurable size list of the network hosts which produced most network connections; and
- reporting said list of the network hosts which produced most network connections.

19. A method of processing network metadata generated on a network transmitting network traffic using one or more network protocols, the network including devices at least some of which receive network traffic through an ingress interface and transmit network traffic through an egress interface, the method comprising the steps of:
- receiving network metadata from a plurality of sources in a data processing system, in at least one data format;
- determining the type or character of said network metadata;

processing said network metadata by applying at least one policy governing network metadata processing, wherein said at least one policy includes the steps of:
- collecting information about internal network devices communicating with external network devices; said information comprising a list of communicating devices' IP addresses and protocols;
- applying a streaming cluster analysis method to determine patterns in communications between the communicating devices;
- identifying abnormal instances of communications between the communicating devices by the presence of small disjoint patterns in the set of all computed patterns;
- generating an alert message in a timely manner to inform of a potential botnet infection if at least one abnormal communication pattern is identified; and converting at least a portion of said network metadata into one or more different data formats that are used in said data processing system for other system metadata, in response, at least in part, to the results of said determining step.

20. A method of processing network metadata generated on a network transmitting network traffic using one or more network protocols, the network including devices at least some of which receive network traffic through an ingress interface and transmit network traffic through an egress interface, the method comprising the steps of:
- receiving network metadata from a plurality of sources in a data processing system, in at least one data format;
- determining the type or character of said network metadata;

processing said network by applying at least one policy governing network metadata processing, wherein said at least one policy includes the steps of:
- comparing the source of incoming network traffic to a predefined list of monitored devices on said network;
- if the source IP address is on a predefined list of devices, storing the source IP in an in-memory database along with the number of bytes and packets reported in the ingress NetFlow record;
- at predefined intervals examining the in-memory database and identifying devices which exceeded a threshold set forth by a network manager;
- generating an alert message in a timely manner to inform of a traffic spike; and converting at least a portion of said network metadata into one or more different data formats that are used in said data processing system for other system metadata, in response, at least in part, to the results of said determining step.

* * * * *